(12) United States Patent
Yip et al.

(10) Patent No.: US 7,986,706 B2
(45) Date of Patent: Jul. 26, 2011

(54) HIERARCHICAL PIPELINED DISTRIBUTED SCHEDULING TRAFFIC MANAGER

(75) Inventors: Thomas C. Yip, Los Gatos, CA (US); Michael Feng, Sunnyvale, CA (US); Sun Den Chen, San Jose, CA (US); Stephen Chow, Monte Sereno, CA (US); Edward Ho, Fremont, CA (US); Patrick Wang, Palo Alto, CA (US); Srivi Dhruvanarayan, Cupertino, CA (US); Ranjit Rozario, San Jose, CA (US); Edmund Chen, Sunnyvale, CA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 164 days.

(21) Appl. No.: 12/432,373

(22) Filed: Apr. 29, 2009

(65) Prior Publication Data

US 2010/0278190 A1   Nov. 4, 2010

(51) Int. Cl.
   *H04L 12/28* (2006.01)
(52) U.S. Cl. ......... 370/412; 370/410; 370/411; 370/413
(58) Field of Classification Search .................. 370/410, 370/411, 412, 413
   See application file for complete search history.

(56) References Cited

U.S. PATENT DOCUMENTS

| | | | |
|---|---|---|---|
| 6,370,144 B1 * | 4/2002 | Chao et al. | 370/395.42 |
| 6,389,031 B1 * | 5/2002 | Chao et al. | 370/412 |
| 6,519,595 B1 * | 2/2003 | Rose | 370/412 |
| 6,594,234 B1 | 7/2003 | Chard et al. | |
| 7,088,710 B1 | 8/2006 | Johnson et al. | |
| 2003/0099199 A1 * | 5/2003 | Kiremidjian et al. | 370/230.1 |
| 2004/0114517 A1 | 6/2004 | Grosbach et al. | |
| 2007/0073949 A1 | 3/2007 | Fredrickson et al. | |

OTHER PUBLICATIONS

International Search Report and Written Opinion for PCT/IB2010/000976, mailed Aug. 5, 2010, 11 pages.

* cited by examiner

*Primary Examiner* — Ayaz R Sheikh
*Assistant Examiner* — Andrew C Lee
(74) *Attorney, Agent, or Firm* — Blakely, Sokoloff, Taylor & Zafman LLP

(57) ABSTRACT

A hierarchical pipelined distributed scheduling traffic manager includes multiple hierarchical levels to perform hierarchical winner selection and propagation in a pipeline including selecting and propagating winner queues of a lower level to subsequent levels to determine one final winning queue. The winner selection and propagation is performed in parallel between the levels to reduce the time required in selecting the final winning queue. In some embodiments, the hierarchical traffic manager is separated into multiple separate sliced hierarchical traffic managers to distributively process the traffic.

23 Claims, 12 Drawing Sheets

HIERARCHICAL PIPELINED DISTRIBUTED SCHEDULING TRAFFIC MANAGER

BACKGROUND

1. Field

Embodiments of the invention relate to the field of network processing; and more specifically, to an hierarchical pipelined distributed scheduling traffic manager.

2. Background

Traffic managers are typically used to implement network quality of service (QoS) in a network such as bandwidth usage, delay, jitter, input rate, and output rate. Traffic managers may be used in an integrated services model characterized by resource reservation. For example, real time applications set up paths and reserve resources along the path prior to transmitting data. RSVP (Resource Reservation Protocol) is a signaling protocol for setting up paths and reserving resources. Traffic managers may also be used in a differentiated services model where packets are marked differently to create several different packet classes. Packets in different classes receive different quality of service treatment by the traffic managers. As another example, traffic managers may be used in a MPLS (Multiprotocol Label Switching) network where packets are assigned labels at the ingress and subsequent classification, forwarding, and quality of service for those packets are based on the labels.

Commonly, to achieve network QoS levels, packets are classified, marked, policed, and shaped by traffic managers. Typically, traffic managers are usually implemented in a flat, non-pipeline, central scheduling approach. Typical traffic managers are required to scan the queues for requesters (e.g., those packets that need processing by the traffic manager).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
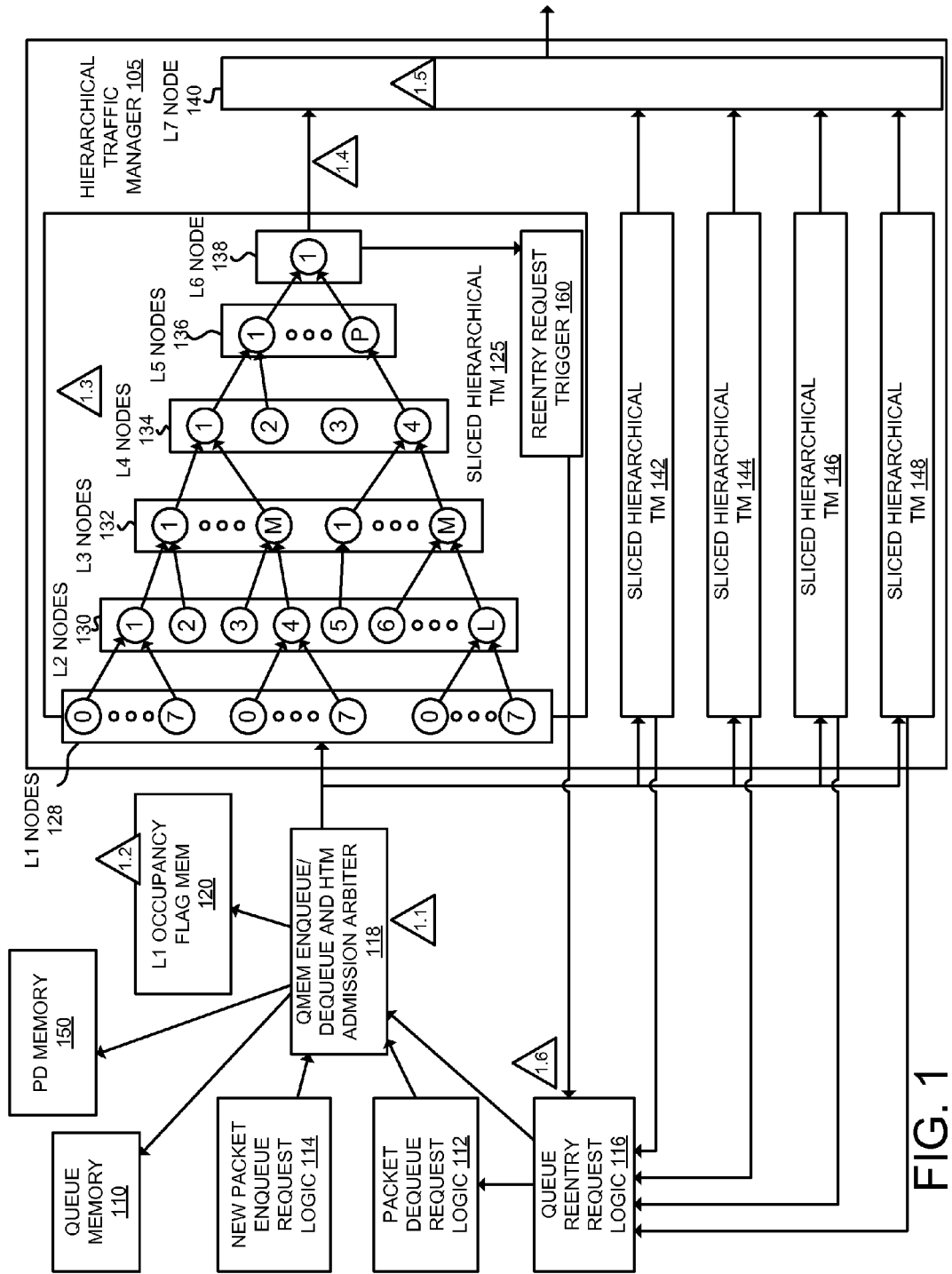
FIG. 1 illustrates an exemplary hierarchical pipelined distributed scheduling traffic manager in a network element according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video).

Some network elements support the configuration of multiple contexts. As used herein, each context includes one or more instances of a virtual network element (e.g., a virtual router or a virtual bridge). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA (authentication, authorization, and accounting) name space, IP address, and routing database(es). Multiple contexts may be employed in an edge network element to provide direct network access and/or different classes of services for subscribers of service and/or content providers.

A method and apparatus for a hierarchical pipelined distributed scheduling traffic manager is described. In one embodiment of the invention, the hierarchical pipelined distributed scheduling traffic manager (referred to herein as the "hierarchical traffic manager") includes multiple hierarchical levels to perform hierarchical winner selection and propagation in a pipeline including selecting and propagating winner queues of a lower level to subsequent levels to determine one final winning queue (the queue that contains packet(s) to exit the hierarchical traffic manager). The winner selection and propagation is performed in parallel between the levels to reduce the time required in selecting the final winning queue. In some embodiments, the hierarchical traffic manager is separated into multiple separate sliced hierarchical traffic managers to distributively process the traffic.

The hierarchical winner selection pipeline is triggered based on certain events and does not require the hierarchical traffic manager to scan for requesters (i.e., the hierarchical traffic manager does not repeatedly scan the queues to find queues with packets to process). In one embodiment, the trigger winner selection events (those events which trigger arbitration) include new packet enqueue requests, queue reentry requests, queue state change from blocked to unblocked, and preemption events.

FIG. 1 illustrates an exemplary hierarchical traffic manager 105 in a network element according to one embodiment of the invention. In some embodiments, the hierarchical traffic manager 105 is included in a packet processing unit of each line card of the network element or is a separate ASIC on each line card of the network element. The hierarchical traffic manager 105 processes packets for many different queues that have been separated due to classification (e.g., behavior aggregate classification which includes the process of sorting packets based only the contents of the differentiated services field, multi-field classification based on the content of multiple fields such as source address, destination address, TOS byte, protocol ID, source port number, destination port number, etc.) and marking (e.g., process to set the differentiated services field). The hierarchical traffic manager 105 includes policers to police the bandwidth usage per class of traffic (e.g., policing is the process of handling out of profile (excessive) traffic), shapers to shape input/output traffic per class of traffic (shaping includes delaying packets within a traffic stream to cause the traffic stream to conform to a predefined traffic profile), and schedulers to schedule the traffic in the order of marked (e.g., prioritized) packets (schedulers are used when determining the order of transmission of packets in a system of multiple queues). The hierarchical traffic manager 105 may be an ingress traffic manager or an egress traffic manager.

As illustrated in FIG. 1, the hierarchical traffic manager 105 includes multiple sliced hierarchical traffic managers (i.e., the sliced hierarchical traffic managers 125, 142, 144, 146, and 148). Each hierarchical traffic manager slice handles a portion of the bandwidth of the aggregate hierarchical traffic manager 105. Each of the sliced hierarchical traffic managers 125, 142, 144, 146 and 148 are functionally equivalent yet separate from each other and each has their own set of nodes, shapers, logic, and memories (which will be described in greater detail later herein). The sliced hierarchical traffic managers 125, 142, 144, 146, and 148 do not perform any sharing with each other. For purposes of explanation, the sliced hierarchical traffic manager 125 will be described; however it should be understood that the operations described in reference to the sliced hierarchical traffic manager 125 are also applicable to sliced hierarchical traffic managers 142, 144, 146, and 148.

It should be understood that while FIG. 1 illustrates five sliced hierarchical traffic managers, the number of sliced hierarchical traffic managers is exemplary and more or less sliced hierarchical traffic managers may be used in embodiments of the invention. In addition, in some embodiments of the invention, a single, non-sliced hierarchal traffic manager is used. In some embodiments, the hierarchical traffic manager 105 is divided into a number of slices based on the maximum amount of traffic expected by any one customer. A customer (e.g., an end user subscriber, an Internet Service Provider (ISP), a service provider getting service from an ISP (e.g., the ISP is wholesaling their bandwidth)) is associated with one or more queues. For example, an end user subscriber may be associated with a few queues while an ISP may be associated with many queues. Each queue is associated with a minimum bandwidth (a guaranteed bandwidth). In some embodiments, queues are associated with different services (e.g., queues for web traffic, queues for VoIP, queues for interactive gaming, queues for video on demand, etc.).

Each of the sliced hierarchical traffic managers 125, 142, 144, 146, and 148 include a hierarchy of levels. For example, the sliced hierarchical traffic manager 125 includes, a lowest level (the largest number of nodes), a plurality of intermediate levels (with a subsequently decreasing number of nodes), and a highest level (with the least number of nodes). For example, from the lowest level (the largest number of nodes) to the highest level (the least number of nodes) the sliced hierarchical traffic manager 125 includes the level 1 (L1) nodes level 128, level 2 (L2) nodes level 130, level 3 (L3) nodes level 132, level 4 (L4) nodes level 134, level 5 (L5) nodes level 136, and level 6 (L6) nodes level 138. According to one embodiment, the L1 nodes level 128 represents queues to store packets that need to be processed by the sliced hierarchical traffic manager 125, and the levels 130-137 represent the topology of the network (e.g., the L2 nodes level 130 represents the subscriber level of the topology, L3 nodes level 132 represents the DSLAM (digital subscriber line access multiplexer) level of the topology, L4 nodes level 134 represents the VLAN (virtual local area network) level of the topology, the L5 nodes level 136 represents the Interlaken channel level of the topology, the L6 node level 138 represents the sub-PPA (packet processing ASIC) physical port level, and the L7 node level 140 represents the PPA port). As will be described later herein, one or more of the levels may include one or more sub-levels.

While seven different levels are illustrated in FIG. 1, it should be understood that more or less levels may be used in embodiments of the invention described herein (e.g., more or less levels may be used for a different network topology). As will be described in greater detail later herein, one or more of these hierarchical levels may be skipped in certain circumstances. It should also be understood that the number the nodes in each level as illustrated in FIG. 1 is exemplary and different numbers of nodes may be used in embodiments of the invention described herein. While in one embodiment each sliced hierarchical traffic manager includes the same number of nodes and/or levels, in alternative embodiments different sliced hierarchical traffic managers include a different number of nodes and/or different number of levels.

The ratio of nodes between levels (e.g., the ratio of nodes between the L1 nodes level 128 and the L2 nodes level 130) is referred to as the "aggregation ratio" (e.g., the number of child nodes connected to a parent node). By way of example, the aggregation ratio between the L1 nodes level 128 and the L2 nodes level 130 is eight to one (i.e., each L2 node in the L2 nodes level 130 (a parent node) has eight child nodes in the L1 nodes level 129). The aggregation ratio is typically determined based on the number of nodes in each level. In some embodiments the aggregation ratio is configurable by system operators. As described above, the L1 level has the most number of nodes and each level thereafter typically has a decreasing number of nodes. Typically, the L7 node level 140 has a single node and each L6 node level 138 of each sliced hierarchical traffic manager also has a single node.

In one embodiment, each parent node is associated with multiple child nodes. For example, each node in the L2 nodes level 130 is mapped to different multiple nodes in the L1 nodes level 128. In one embodiment, a node in a lower level (a child node) is mapped to a single node in a higher level (a parent node) at any given time. In order to provide for level skipping, a system operator may associate a node in a lower level with a node in a higher level which skips other higher levels (e.g., a node in L2 nodes level 132 may be mapped to a node in the L4 nodes level 134 thereby skipping the L3 level).

The sliced hierarchical traffic managers 125, 142, 144, 146, and 148 each select a L6 winner based on a pipelined winner selection and propagation mechanism. For example, each sliced hierarchical traffic manager selects a L2 winner from a group of L1 nodes (L2 node's child nodes) according to their scheduling precedence parameters, propagates the L2 winner to the input of a L3 node, selects a winner from a group of L2 nodes (L3 node's child nodes) according to their scheduling precedence parameters, propagates the L3 winner to the input of a L4 node, and so on, until a L6 winner is selected. Each L6 winner of each sliced hierarchical traffic managers 125, 142, 144, 146, and 148 is then input to the L7 node 140 for L7 winner selection.

Each node, with an exception of the node in the highest level (e.g., the L7 node 140) is associated with a set of traffic management parameters that are used to control each node's bandwidth usage relative to its peer nodes of the same level, traffic rate, latency, and temporary traffic suspension (e.g., in order to treat the nodes fairly and in order to comply with any service level agreements). In one embodiment, WDRR (weight deficit round robin) is used for controlling each node's relative bandwidth usage (e.g., through use of WDRR weight tokens), rate tokens are used to control traffic rate, eight different priorities are used for latency control, and a system operator programmable blocked bit is used to temporarily suspend traffic. It should be understood that each level may use a different subset of the traffic management parameters. In addition, it should be understood that less parameters, additional parameters, and/or different traffic management parameters may be used in embodiments of the invention described herein. As will be described later herein, some of the set of traffic management parameters are propagated along the traffic pipeline, while others are calculated at different levels (e.g., rate status).

In one embodiment, a parent node of at least some of the levels (e.g., the levels 2-4) categorizes its child nodes in an arbitration precedence hierarchy according to their priority, rate status, and weight token status. For example, the parent node categorizes their child nodes by priority (a child node with a higher priority takes precedence over a child node with a lower priority). For each priority group, the parent node categorizes the child nodes among the rate status (e.g., a below minimum group, a below maximum group, and an above maximum group). For each rate status group, the parent node categorizes the child nodes by weight token status (e.g., a positive weight token status group, and a negative weight token status group).

A node in a level other than the nodes in the L1 nodes level 128 typically includes a requester and a scheduler/arbiter. For example, FIG. 5, which will be described in greater detail later herein, is a block diagram illustrating an exemplary L2 node 400 (a node at the L2 nodes level 130).

The queue memory enqueue/dequeue and hierarchical traffic manager admission arbiter 118 (hereinafter "arbiter 118") arbitrates between different requesters (e.g., new packet enqueue requests, packet dequeue requests, queue reentry requests) to determine access to the hierarchical traffic manager 105 and updating of the queue memory 110 and the PD (packet data) memory 150. In one embodiment, the arbiter 118 enqueues packets to their designated queue at line rate. The queue memory 110 stores information for each of the queues (e.g., for each queue: in-flight packet count, in-flight packet bytes, weight token counters, rate token counters, etc.). The PD memory 150 stores information for packets of each queue (e.g., head/tail pointers of each packet).

The arbiter 118 allows admission of packets to the hierarchical traffic manager 105 without the hierarchical traffic manager scanning the queues (e.g., of the queue memory 110) for packets. Thus, unlike typical prior art traffic managers which scan the queues for requesters, the hierarchical traffic manager 105 is provided the requesters (e.g., the queues that include packets) that require processing by the hierarchical traffic manager 105. The arbiter 118 selects among different groups of requesters to admit to the hierarchical traffic manager 105 (e.g., new packet enqueue requests, packet dequeue requests, and queue reentry requests). Thus, at operation 1.1, the arbiter 118 arbitrates for the access of the queue memory 110 among new packet enqueue requests from the new packet enqueue request logic 114 (e.g., the new packet enqueue requests generated responsive to receipt of a trigger from a processor such as an execution unit (EU) or line processor (LP), a packet reordering logic, etc.), packet dequeue requests from the packet dequeue request logic 112 (e.g., the packet dequeue requests generated responsive to a trigger from an EU/LP or from the queue reentry request logic 116), and queue reentry requests from the queue reentry request logic 116 (e.g., the queue reentry requests generated responsive to receiving a trigger from the queue reentry request trigger 160 representing a previous L6 winner).

Figure 2:
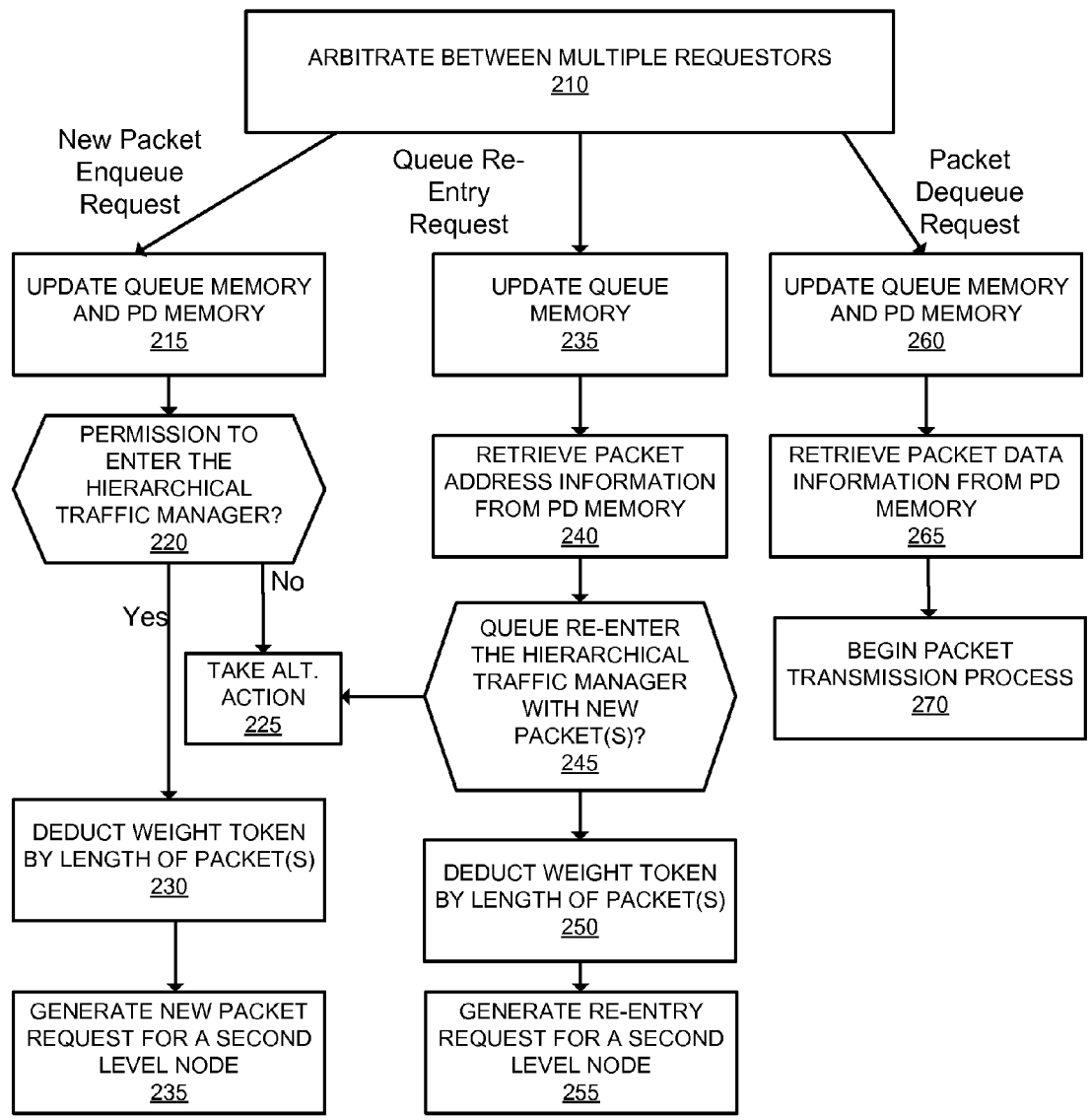
FIG. 2 is a flow diagram illustrating exemplary operations for admitting requests into the hierarchical pipelined distributed scheduling traffic manager according to one embodiment of the invention.

FIG. 2 is a flow diagram illustrating exemplary operations performed by the arbiter 118 according to one embodiment of the invention. At block 210, the arbiter 118 arbitrates between multiple requesters (e.g., new packet enqueue requests from the new packet enqueue request logic 114, packet dequeue requests from the packet dequeue request logic 112, and queue reentry requests from the queue reentry request logic 116, in that order of precedence).

If the selected request is one of the new packet enqueue requests, then flow moves to block 215. For each of the new packet enqueue requests, the EU/LP (execution unit/line processor) provides a queue identifier (Qid) and packet data (PD) information for the packet. At block 215, the arbiter 118 updates the queue memory 110 (e.g., increments the packet count, byte count, etc.) and packet data memory (e.g., packet address link list).

Flow moves from block 215 to block 220, where the arbiter 118 determines whether the packet has permission to enter the hierarchical traffic manager 105. For example, with reference to FIG. 1, at operation 1.2, the arbiter 118 will not admit the packet upon determining that the L1 occupancy flag memory 120 indicates that the queue belonging to the packet is already admitted to the hierarchical traffic manager 105 but it has not been selected by an L6 winner (e.g., the flag will be set if the queue is already admitted but has not been selected by the L6 winner). If the packet has permission to enter the hierarchical traffic manager 105, then flow moves to block 230, otherwise flow moves to block 225 where alternative action is taken (e.g., the packet is dropped, the packet is punted to the EU/LP, etc.).

At block 230, the arbiter 118 updates the running weight token (e.g., WDRR token) of the queue by subtracting the length of the packet. It should be understood that after some time, the running weight token for the queue will become negative (embodiments to refresh the weight tokens will be described later herein). Flow moves from block 230 to block 235, where the arbiter 118 generates a new packet enqueue request for a second level node of the hierarchical traffic manager 105 (the new packet enqueue request includes the Qid associated with the new packet).

In some embodiments, after a queue is admitted into the second level of the traffic manager, the packet(s) of that queue are considered on the way out and are not returnable to the queue memory 110. In addition, the initial admission into the hierarchical traffic manager 105 of a queue triggers arbitration and also secures a place for that queue for future arbitration if it loses the initial arbitration. The arbitration triggers winner propagation, which will trigger the parent's node arbitration, and this process is repeated until a last level winner is selected.

A set of parameters (e.g., priority, weight status, rate status, etc.) are used as arbitration parameters. In one embodiment, the packet length, priority, and WDRR token status will be propagated with the packet through the arbitration process while the rate status is recalculated at every level (e.g., in order to prevent a queue from starving, the rate status may be updated periodically (a queue may become starved if it is "above max" when it is originally enqueued and this does not change even after new rate tokens are given to the queue)).

If the selected request is a queue reentry request (e.g., from the queue reentry request logic 116), the queue reentry request logic 116 provides the Qid of the queue to the arbiter 118 and flow moves to block 235 (e.g., the queue reentry request trigger 160 provides the queue reentry request logic 116 with the Qid of the packet winner which in turn provides the Qid of the packet winner to the queue reentry request logic 116, the EU/LP provides the Qid for the request). At block 235, the arbiter 118 updates the queue memory 110 (e.g., decrements the packet count, decrements the byte count, etc., for the queue).

Flow moves from block 235 to block 240, where the arbiter 118 retrieves the packet address information from the packet data memory 150. Flow moves from block 240 to block 245, where the arbiter 118 determines whether the queue will re-enter the hierarchical traffic manager with new packet(s) (e.g., whether the queue contains packets for the hierarchical traffic manager). If the queue will not enter the hierarchical traffic manager with new packet(s), then flow moves to block 225 where alternative action is taken (e.g., a de-queue request is generated). If the queue includes new packet(s), then flow moves to block 250 where the arbiter 118 deducts the weight token of the queue by the length of those packet(s). Flow then moves to block 255 where the arbiter 118 generates a queue reentry request for a second level node in the hierarchical traffic manager 105.

If the selected request is one of the packet dequeue requests, flow moves to block 260. For each of the packet dequeue requests, the dequeue request logic 112 provides the Qid of the packet to be dequeued (e.g., queue reentry request trigger 160 provides the queue reentry request logic 116 with the Qid of the packet winner, which in turns provides the Qid of the packet winner to the packet dequeue request logic 112 which provides the Quid to the arbiter 118, the EU/LP provides the Qid of the packet to be dequeued, etc.). At block 260, the arbiter 118 updates the queue memory 110 and the PD memory 150 (e.g., decrement the packet count, decrement the byte count, decrement the offset, writing a new offset value, etc.) for the dequeued packet. Flow moves from block 260 to block 265, where the arbiter 118 retrieves the packet data information from the packet data memory 150. Flow moves from block 265 to block 270, where the arbiter 118 begins the packet transmission process.

When a request is admitted to the hierarchical traffic manager 105, it triggers a winner selection pipeline which pushes the request through the levels of hierarchy (seven levels as illustrated in FIG. 1). For example, when one of the new packet enqueue requests 114 is admitted to the hierarchical traffic manager 105, a winner selection and propagation pipeline is triggered which pushes the queue of that packet through the levels of hierarchy of until a final winner is selected. For example, at operation 1.3, the request has triggered a winner selection and propagation pipeline in the sliced hierarchical traffic manager 125 (the request has been admitted to the sliced hierarchical traffic manager 125) and the sliced hierarchical traffic manager 125 determines a L6 winner (each other sliced hierarchical traffic manager also determines their own L6 winner, independent from the request). For example, the process begins by determining a L2 winner from a group of L2 requesters (e.g., a plurality of L1 nodes). For example, as illustrated in FIG. 1, the node 1 of the L2 nodes level 130 determines a L2 winner from the group 0 to 7 nodes in the L1 node level 128. The L2 winner is propagated to level 3, where a L3 winner is determining from a group of L3 requesters (e.g., a plurality of L2 nodes). For example, as illustrated in FIG. 1, the node 1 of the L3 nodes level 132 determines a winner from a group of L2 nodes 1 and 2 of the L2 nodes level 130. The above process is repeated until a L6 winner is determined. The winner selection process is performed in parallel and is done in a distributed fashion. For example, as will be described in greater detail later herein, the winner process may overlap and may be performed in parallel.

At operation 1.4, the L6 winners of each of the sliced hierarchical traffic managers 125, 142, 144, 146, and 148 are propagated to the L7 node 140. At operation 1.5., the L7 node 140 determines a L7 winner and propagates the winner's Qid for further processing (e.g., transmitting, etc.). At operation 1.6, the queue reentry request trigger 160 of each sliced hierarchical traffic manager propagates the L6 winner to the queue reentry request logic 116 for potential reentry into the hierarchical traffic manager. The queue reentry request trigger 160 may also cause the queue reentry request logic 116 to trigger the packet dequeue request logic 112 to generate a packet dequeue request.

Figure 3:
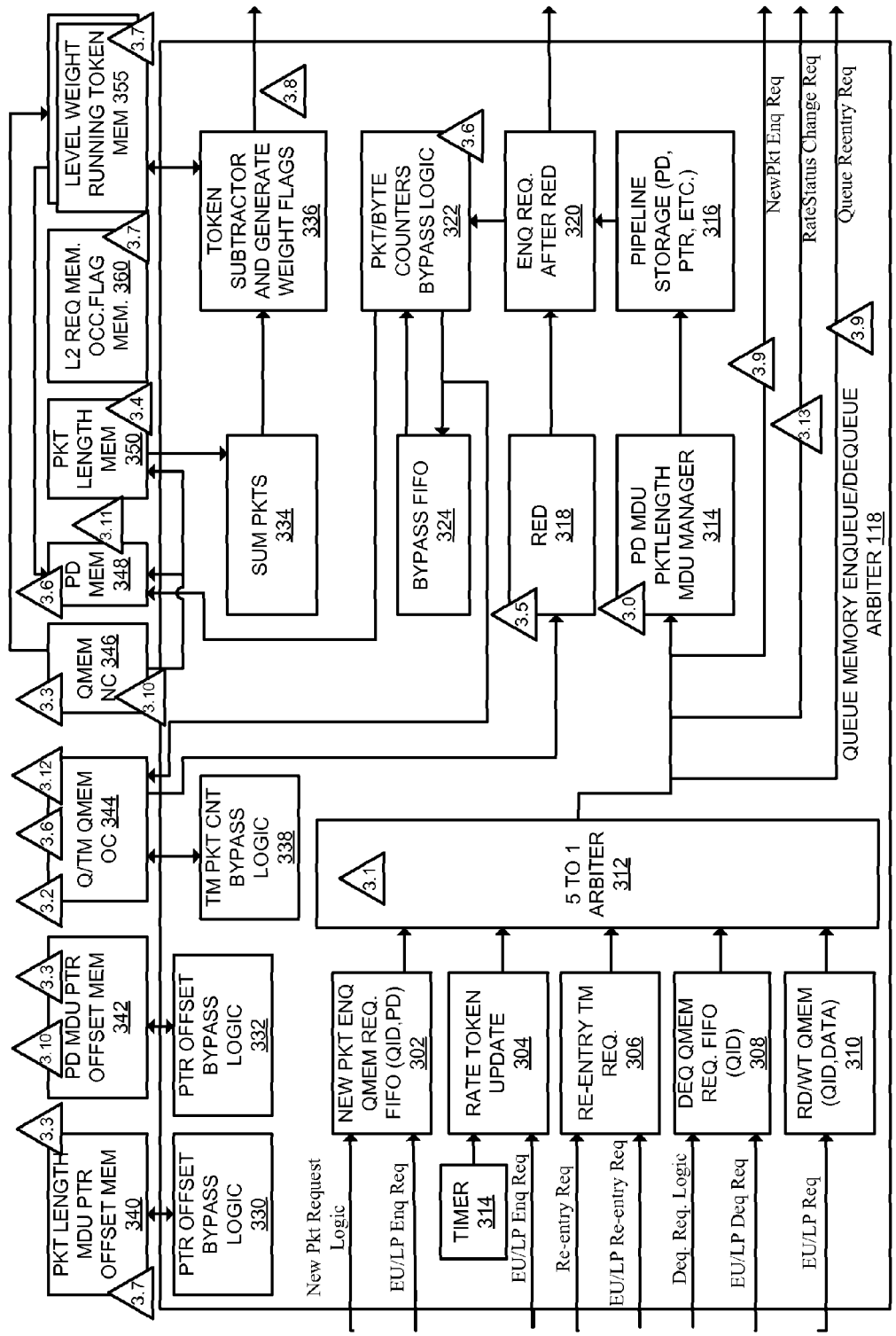
FIG. 3 is a block diagram illustrating an exemplary queue memory enqueue/dequeue and hierarchical traffic manager admission arbiter according to one embodiment of the invention.

FIG. 3 is a block diagram illustrating an exemplary arbiter 118 according to one embodiment of the invention. At operation 3.0 in FIG. 3, the PD (packet data) MDU (memory data unit) packet length MDU manager 314 pre-fetches an MDU for the PD storage and an MDU for the packet length of the packet entering the arbiter 118, and the resulting data is stored in the pipeline storage 316.

After pre-fetching the MDU, at operation 3.1, the 5 to 1 arbiter 312 arbitrates (selects) from among five different groups of requesters (e.g., from the new packet enqueue qmem (queue memory) request FIFO 302, the rate token update 304, the reentry traffic manager request 306, the dequeue qmem request FIFO 308, and the read/write qmem 310) to further process (these are scheduled in order to avoid a resource conflict). Of course it should be understood that one or more of the requesters may not currently have a pending request. The new packet enqueue qmem request FIFO 302 receives new packet enqueue requests from the new packet enqueue request logic 114 (e.g., new packet enqueue requests generated responsive to receipt of a trigger from a processor such as an EU/LP or a packet reordering logic, etc.). The rate token update request 304 receives rate token update requests from the timer 314 (e.g., upon the timer 314 expiring) or from an EU/LP. The reentry traffic manager request 306 receives queue reentry requests from the queue reentry request logic 116 (e.g., triggered from the last level winner in the sliced hierarchical traffic manager 125 (e.g., the queue reentry request trigger 160 as illustrated in FIG. 1 which is typically generated whenever there is a new L6 winner) or from an EU/LP). The requests in the dequeue qmem request FIFO 308 are generated from the packet dequeue request logic 112 (e.g., triggered from the queue reentry request logic 116 or from an EU/LP) when a packet is ready to leave its queue. The read/write qmem 310 requests are received from an EU/LP and are generated when that EU/LP needs access to those resources which are used by normal operations (e.g., enqueue, dequeue, reentry). In one embodiment, the arbiter 312 selects the requests in the following order of precedence: new packet enqueue requests, packet dequeue requests, queue reentry requests, rate token updates, and EU/LP read/write memory requests.

If the selected request is a new packet enqueue request, the arbiter 118 prepares for a RED (random early detection) check before enqueuing the corresponding packet into a queue by retrieving queue information such as the queue depth to decide whether to accept or reject the packet. Thus, at operation 3.2, the RED logic 318 retrieves the queue's counters from the queue/traffic manager qmem OC (only counters) 324. In some embodiments of the invention, rather than using a RED algorithm, a different active queue management algorithm is used (e.g., a tail drop algorithm).

If the selected request is a new packet enqueue request or a queue reentry request, the arbiter 118 prepares for enqueue and hierarchical traffic manager admission. For example, to prepare for a new packet enqueue request, the arbiter 118 locates a free memory location (PD MDU tail pointer and offset) to store the new packet data. Thus, for a new packet enqueue request, at operation 3.3, a free memory location is found and the tail pointer is stored in the qmem NC (no counters) 346 and the offset is stored in the PD MDU pointer offset memory 342. To prepare for traffic manager admission, the arbiter 118 locates a free memory location (a length MDU tail pointer and offset) to store the new packet's length. The tail pointer is stored in the qmem NC 346 and the offset is stored in the packet length MDU pointer offset memory 340.

Sometime later, at operation 3.4, the arbiter 118 prepares for batch size computation (if batch packets will be used, which will be described in greater detail later herein). Packet batching is a process that allows a L1 node to carry X number of packets as a single requester to its parent node (in the L2 nodes level). The winner of the L2 node inherits the X number of packets and propagates them as a batch to its parent, and so on, until a single L7 winner is found. In one embodiment, the hierarchical traffic manager 105 supports a number of packets being batched into the traffic manager. The maximum number of packets that can be batched into the traffic manager without violating a software programmable maximum burst size is determined by retrieving the packet length information from the packet length memory 350 for each of the packets and performing a sum of those packet lengths using the sum packets logic 334, where the sum of the packet lengths needs to be less than the maximum burst size (if greater than the maximum burst size, alternative action is taken (e.g., the packets are dropped, the packets are punted to the EU/LP, only a portion of the packets are processed, etc.). For example, for new packet enqueue requests, the batched packet size will be 1 because the queue has turned from empty to non-empty. For queue reentry requests, the batched packet size will vary depending on how many packets are in the queue and the packet size.

Sometime later, at operation 3.5, the RED logic 318 performs the RED algorithm (or other active queue management algorithm such as a tail drop algorithm) on the packet (based on the information generated in operation 3.2). If the packet is rejected, the enqueue request after RED logic 320 either drops the packet or punts the packet to the EU. If the packet is accepted, then the enqueue request after RED logic 320 passes the logic to the packet/byte counters bypass logic 322 where at operation 3.6, the packet is enqueued into the queue memory 110. To enqueue the packet, the packet data of that packet is written to the PD memory 348 and the pointer is updated in the queue/traffic manager qmem OC 344 and the PD MDU pointer offset memory 342.

At operation 3.7, the arbiter 118 prepares the packet for hierarchical traffic manager admission including checking the L2 request occupancy memory flag memory 360 to determine whether the L2 request occupancy memory flag is set. The L2 request occupancy memory flag memory 360 stores one bit per queue, where the state of the bit indicates whether the queue has been admitted into the hierarchical traffic manager 105. In one embodiment, the L2 request occupancy memory flag only has effect on new packet admission and does not affect reentry. If the flag is set, then new packet admission for the queue will be denied.

If a batch of packets is being admitted to the hierarchical traffic manager 105, the level weight running token memory 355 for level 2 is deducted by the batch amount. In addition, the weight state (negative or positive token, which will be described in greater detail later herein) is recomputed according to the new running token against the default token value. The L2 weight running token is retrieved from the level weight running token memory 355 for level 2. In addition, the above is repeated for each level in the level weight running token memory 355 (e.g., level 3_1, level 3_2, level 3_3, level 3_4, and level 4). Additionally, in order to keep track of the number of packets in the queue after traffic manager admission, the tail pointer offset value is reduced by the batched size and the updated value is written into the packet length MDU pointer offset memory 340.

If the queue passes the admission check (the occupancy memory check described in operation 3.7), at operation 3.8 the queue will be admitted to the hierarchical traffic manager along with a set of status flags (e.g., Qid (queue identifier), packet counts, byte counts, level weight token flags (levels 1, 2, 3_1, 3_2, 3_3, 3_4, 4), the rate status of the queue (e.g., below minimum, above maximum), and the class of service (CLS)). As illustrated in FIG. 3, the token subtractor and generate weight flags 336 generates the weight flags for the level.

At operation 3.9, the arbiter 118 generates a request (e.g., a new packet enqueue request or a queue reentry request) to a level 2 node (e.g., a level two scheduling block).

If the 5 to 1 arbiter 312 grants a packet dequeue request, at operation 3.10 the arbiter 118 prepares for dequeuing by locating the PD information corresponding to the packet is stored (e.g., in the PD MDU pointer offset memory 342 and the qmem NC 346). It should be noted that after a packet is dequeued, the pointer offset is deducted by 1 and the new offset value is written back to the PD MDU pointer offset memory 342. At operation 3.11, the arbiter 118 retrieves the packet data information from the PD memory 348 to continue processing the packet (e.g., start the packet transmission process).

If the request selected is a rate token update request, at operation 3.12 the arbiter 118 prepares for rate token update by retrieving the rate token running counter for the queue and the rate profile for the queue from the queue/traffic manager qmem 344. As described above, rate tokens are used to control the traffic rate of each node relative to its peer nodes of the same level (e.g., those nodes that are part of the same requester group). Each queue will be associated with a number of rate tokens (the size and number of rate tokens are configurable) which represent a rate status. The rate status is one of below minimum rate, below maximum rate, above maximum rate, and no exceed (which prevents the node from going above its max rate—and thus prevents the node from being allowed to participate in arbitration). Nodes with a rate status of below minimum are favored over nodes with a rate status of below maximum, which are favored over nodes of above maximum.

After the rate token running counter and the rate profile are retrieved, the arbiter 118 adds one or more tokens to the rate token running counter for the queue (e.g., the number of tokens that are added is specified in the rate profile). If the added rate token causes a rate status change (e.g., a change from above maximum to below maximum), then at operation 3.13 the arbiter 118 generates a rate status change request to a level 2 node (e.g., a level two scheduling block).

Thus, in one embodiment, the arbiter 118 from 5 requester groups (new packet enqueue requests, queue reentry requests, packet dequeue requests, read/write requests, and rate token update requests) and may propagate three different requests to subsequent levels (new packet enqueue requests, queue reentry requests, and rate status change requests).

Figure 4:
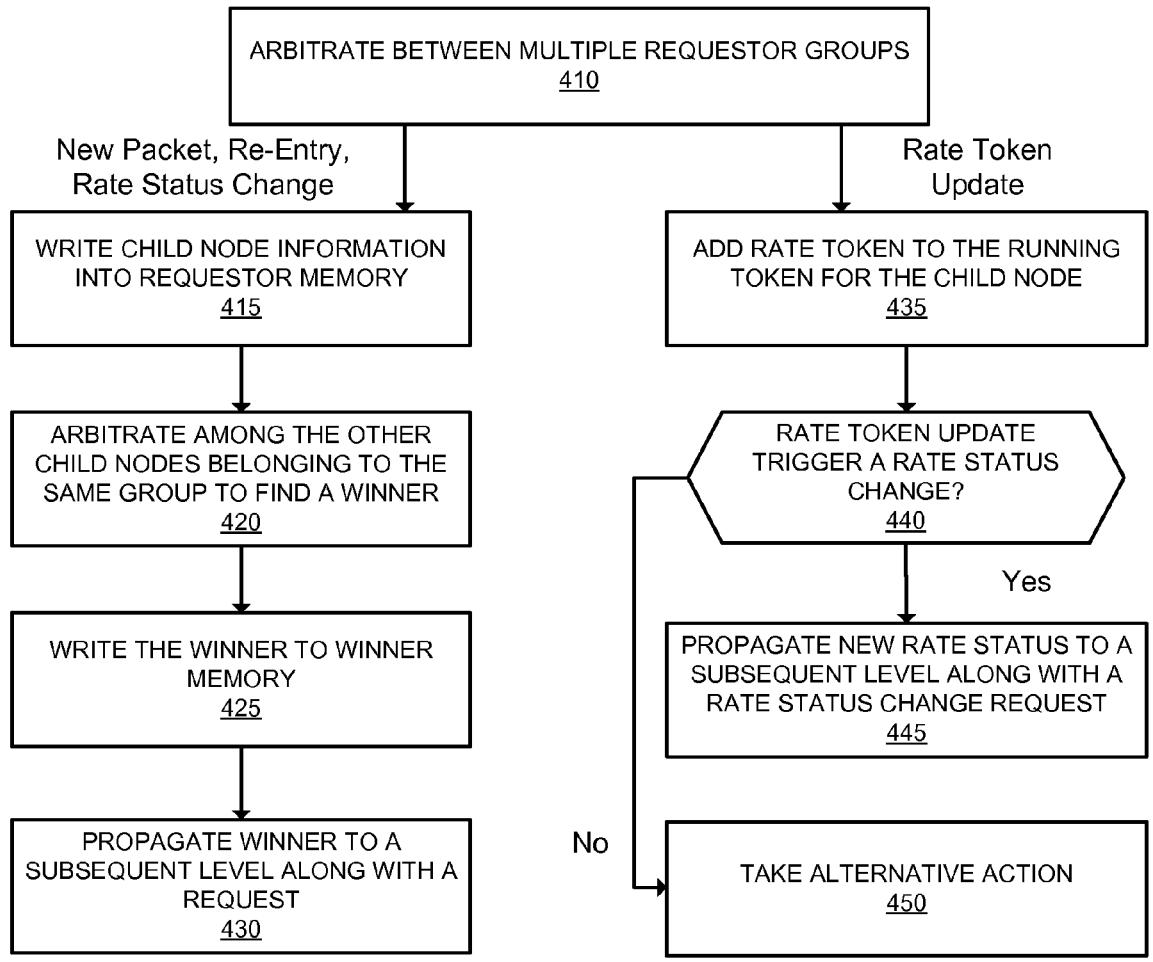
FIG. 4 is a flow diagram illustrating exemplary operations for determining winning queues at a node in a hierarchical level according to one embodiment of the invention.

FIG. 4 is a flow diagram illustrating exemplary operations for determining winning queues at a node in a hierarchical level according to one embodiment of the invention. By way of example, the operations described in FIG. 4 are performed by each node in the L2 nodes level 130, the L3 nodes level 132, the L4 nodes level 134, the L5 nodes level 136, and the L6 nodes level 138 of the sliced hierarchical traffic manager 125 of FIG. 1. However, it should be understood that the operations described in reference to FIG. 4 can be performed by embodiments of the invention other than those discussed with reference to FIG. 1, and FIG. 1 can be performed by embodiments other than those discussed with reference to FIG. 4. Thus, as an example, the following operations will be described with reference to the node 1 of the L2 nodes level 130.

At block 410, the node 1 of the L2 nodes level 130 arbitrates between multiple requester groups (e.g., a group of new packet enqueue requests, a group of queue reentry requests, a group of rate status change requests, and a group of rate token update requests) and selects one of those requests. If the selected request is a new packet enqueue request, a queue reentry request, or a rate status change request, flow moves to block 415. If the selected request is a rate token update request, then flow moves to block 435.

At block 415, the node 1 of the L2 nodes level 130 writes the child node information corresponding to the request into its requester memory. For example, if the selected request is a new packet enqueue request, the child node information of the queue of the newly enqueued packet is written into the requester memory. As another example, with reference to FIG. 1, if the selected request is a queue reentry request, the child node information corresponding to the queue that was selected by the L6 node level 138 as the level six winner is written into the requester memory. As another example, if the selected request is a rate status change request, the child node information corresponding to the node which the rate status change affects is written to the requester memory. Flow next moves to block 420.

At block 420, the node 1 of the L2 nodes level 130 arbitrates among the other child nodes belonging to the same group to determine a winning queue. For example, with reference to FIG. 1, the node 1 of the L2 nodes level 130 arbitrates among the nodes 0 to 7 of the L1 nodes level 128 which point to the node 1 of the L2 nodes level 130. Flow next moves to block 425, where a set of information for the winning packet is written into winner memory. Flow then moves to block 430, where the winning packet is propagated to a subsequent level along with a request (e.g., corresponding with the selected request). The winning packet may be propagated to the next level in hierarchy (e.g., from level 2 to level 3) or it may be propagated to any subsequent level (level skipping) (e.g., from level 2 to level 4).

If the selected request is a rate token update request, then flow moves to block 435. At block 435, one or more rate tokens are added to the running token for the child node queue corresponding to the rate token update request. Flow then next moves to block 440, where the node 1 of the L2 nodes level 130 determines whether the rate token update triggered the rate status of the child node to change. If the rate status changed, then flow moves to block 445 where the node 1 modifies the rate status of the child node and propagates the rate status to a subsequent level along with a rate status change request. If the rate status did not change, then flow moves to block 450 where alternative action is taken.

Figure 5:
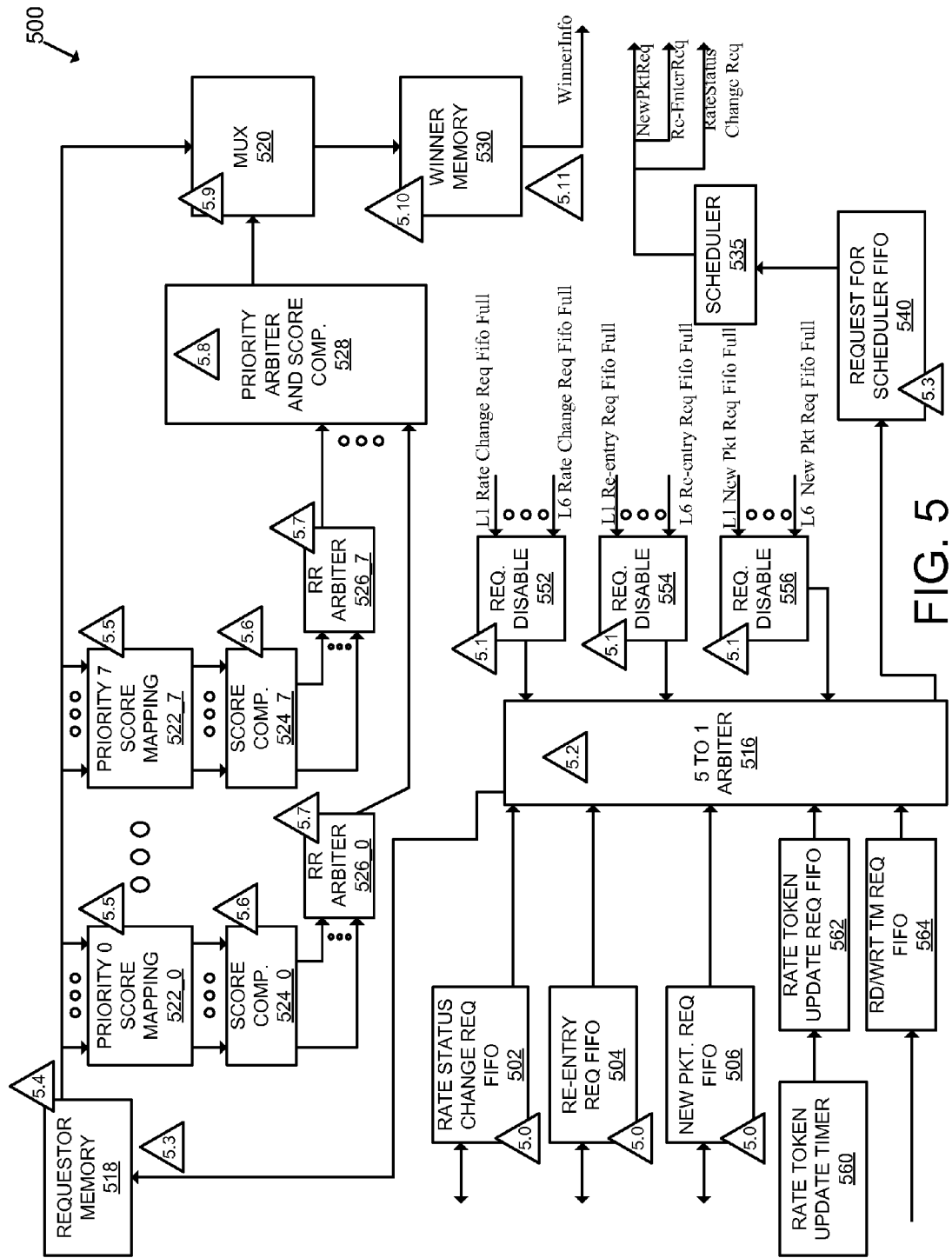
FIG. 5 is a block diagram illustrating an exemplary node at an intermediate level of the sliced hierarchical traffic manager according to one embodiment of the invention.

FIG. 5 is a block diagram illustrating an exemplary L2 node 500 (a node at the L2 nodes level 130 of the sliced hierarchical traffic manager 125) according to one embodiment of the invention. As illustrated in FIG. 5, the L2 node 500 performs arbitration and scheduling for a group of L2 requesters (e.g., a plurality of L1 nodes). The L2 node 500 determines one winner, which is propagated to subsequent level (e.g., the level 3, or a different level if level skipping is supported).

At operation 5.0, the L2 node 500 receives the requests generated from the group of L2 requesters (e.g., the plurality of L1 nodes). The new packet enqueue requests are received and stored in the new packet enqueue request FIFO 506, the queue reentry requests are received and stored in the queue reentry request FIFO 504, and the rate status change requests are received and stored in the rate status change request FIFO

502. At operation 5.1, the L2 node 500 captures the FIFO full condition from all other levels in the sliced hierarchical traffic manager 125 (e.g., levels 1, and 2-6). For example, the FIFO full condition for rate of change requests are received and stored in the request disable memory 552, the FIFO full condition for the queue reentry requests are received and stored in the request disable memory 554, and the FIFO full condition for the new packet enqueue requests are received and stored in the request disable memory 556.

At operation 5.2, the 5 to 1 arbiter 516 arbitrates between the multiple requester groups (requests from the rate status change request FIFO 502, the queue reentry request FIFO 504, the new packet enqueue request FIFO 506, the rate token update request FIFO 562, and the read/write traffic manager request FIFO 564). The rate token update requests are typically received from expiration of the rate token update timer 560. In one embodiment, the 5:1 arbiter 516 arbitrates the requests in the following order of precedence: new packet enqueue requests, queue reentry requests, rate status change requests, rate token updates, and read/write requests. In one embodiment, the arbiter 516 will not select a new packet enqueue request, a queue reentry request, and a rate status change requests if a corresponding upper level request FIFO is full (e.g., as determined by the request disable memories 552, 554, and 556).

At operation 5.3, the L2 node 500 writes the child node information (e.g., the arbiter flags) propagated from L1 (e.g., those nodes of the L1 nodes level 128 which are associated with the L2 node 500) into the requester memory 518. In one embodiment, the requester memory 518 is shared among the other nodes in the L2 node level (e.g., the other nodes in the L2 nodes level 130 of the sliced hierarchical traffic manager 125). The child nodes of the node 500 are grouped together to form one row of memory in the requester memory 518 and the columns in the requester memory 518 are the total number of nodes in the L2 node level. In addition to writing the child node information, the L2 node 500 writes to the request for scheduler FIFO 540 to signal a winner arbitration process is needed. Only a single write per each row of child nodes is needed. Thus, a write to the request for scheduler FIFO 540 will be masked off if there is a pending request from a child from the same row.

At operation 5.4, the scheduler 535 causes the arbiter flags to be provided to the priority score mapping logics 522_0 through 522_7. The arbiter flags is a set of flags which are used as arbitration parameters. They include flags for the rate status, per level weight token status, and CLS or priorities. For example, with reference to FIG. 1, if the L2 node 500 is the node 1 of the L2 nodes level 130, each of the child nodes 0 to 7 of the L1 nodes level 128 that point to the node 1 of the L2 nodes level 130 is associated with a set of arbiter flags. Each of these nodes may have a different precedence than other nodes (they also may have the same precedence value). At operation 5.5, for each child node, the arbiter flags are mapped to a value for comparison against the other child nodes mapped values. For example, as illustrated, since there are 8 child nodes for the node 500 (assuming the node 500 is the node 1 of the L2 nodes level 130), there may be 8 priority mappings respectively (priority 0 score mapping 522_0 through priority 7 score mapping 522_7). The larger the mapped number is the higher precedence the node has.

At operation 5.6, for each node priority, the score comparator 524_0 through the score comparator 524_7 finds the node with the highest mapped value. If there are multiple nodes with the highest mapped value, then at operation 5.7 the round robin arbiter 526_0 through 526_7 perform a round robin scheduling algorithm (e.g., WDRR (weighted deficit round robin), strict round robin), to select the winner among the nodes with the same mapped value. The winner of each priority is passed to the priority arbiter and score comparator logic 528, where at operation 5.8, it selects a winner from each of those previous winner to find a final level 2 winner (e.g., the priority arbiter and score comparator logic 528 uses strict priority to select the final level 2 winner).

The final level 2 winner is passed to the multiplexer 520 along with a set of one or more of the arbitration parameters for the winner at operation 5.9. At operation 5.10, the set of information for the winner is written into the winner memory 530. If the arbiter 516 granted a new packet enqueue request, at operation 5.11, a new packet enqueue request is generated for the next level (e.g., level 3) along with the winner information. If the arbiter 516 granted a queue reentry request, at operation 5.11 a queue reentry request is generated for the next level along with the winner information. If the arbiter 516 granted a rate status change request, at operation 5.11 a rate-status change request is generated for the next level along with the winner information.

If the request granted is a rate token update, according to one embodiment a similar procedure as described with reference to FIG. 3 is performed by the layer 2 node 500.

In some embodiments of the invention, any physical level of the hierarchical traffic manager 105, with the exception of the first level (e.g., queue level), can be skipped during the winner selection and propagation process. In one embodiment, the system operator may configure any node of a physical hierarchical traffic manager level as being mapped to a node at a different level than the next subsequent level (e.g., a level 1 node can skip level 2 and map to any other levels, etc). System operators may want to skip certain levels for those network deployments that do not match the physical levels. For example, a particular network deployment may not need each physical level in the hierarchical traffic manager (e.g., it may only require 3 levels instead of 5 levels).

In some embodiments of the invention, the system operators may configure at which level the packet dequeuing process should be triggered. For example, with reference to FIG. 1, system operators may configure that level 6 winners should be triggered for packet dequeuing prior to being selected as level 7 winners.

Figure 6:
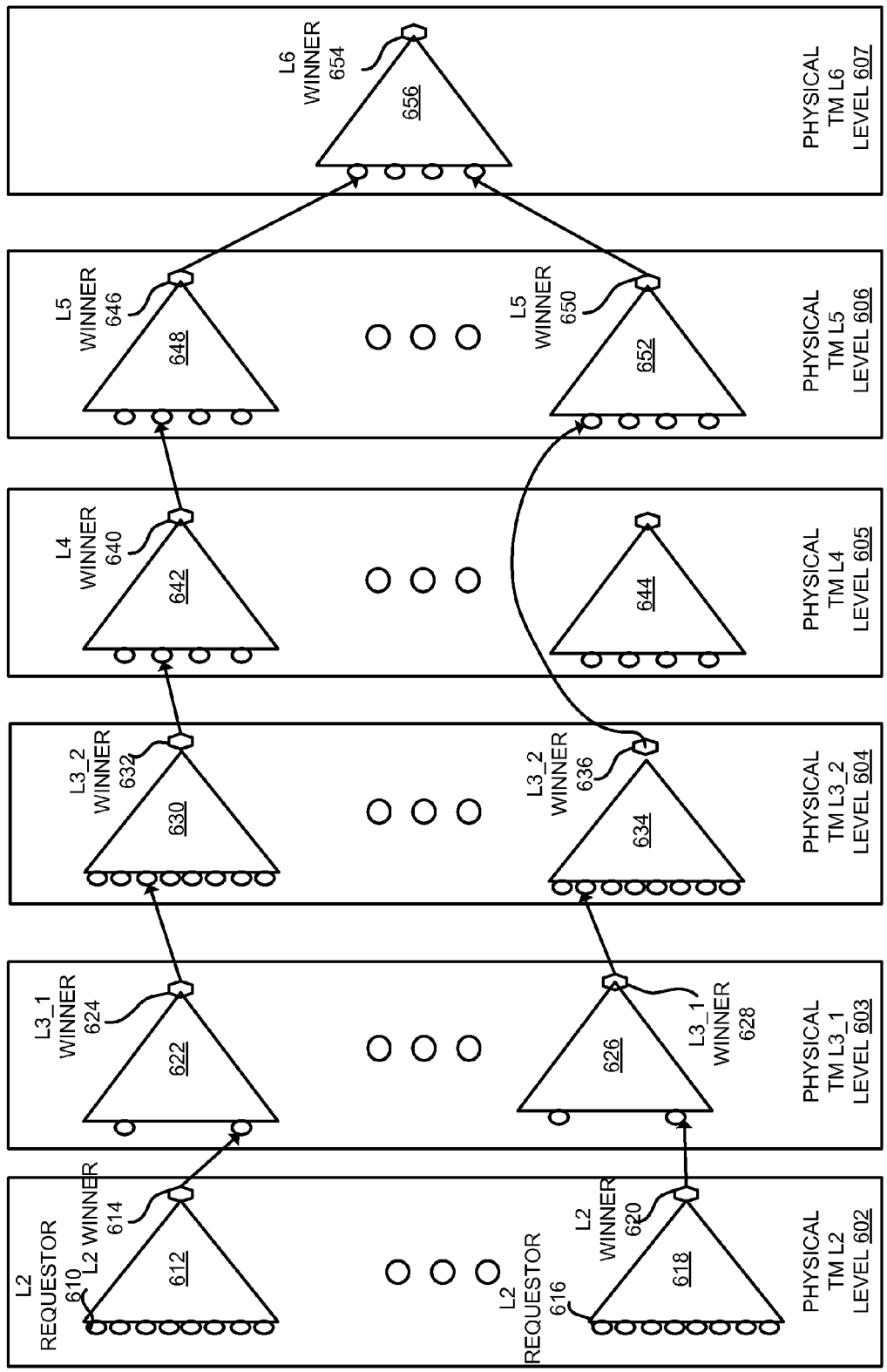
FIG. 6 is a block diagram illustrating skipping levels in the hierarchical traffic manager according to one embodiment of the invention.

FIG. 6 is a block diagram illustrating skipping levels in the hierarchical traffic manager according to one embodiment of the invention. As illustrated in FIG. 6, there are six physical traffic manager levels (physical traffic manager L2 level 602, physical traffic manager L3_1 level 603, physical traffic manager L3_2 level 604, physical traffic manager L4 level 605, physical traffic manager L5 level 606, and the physical traffic manager L6 level 607) in a hierarchical traffic manager illustrated in FIG. 6 (the L1 level is not illustrated since it cannot be skipped). Each physical traffic manager level with the exception of the physical traffic manager L6 level 607 includes multiple nodes. The physical traffic manager L2 level 602 includes the nodes 612 and 618. The node 612 selects from the L2 requesters (the L2 requester 610 is an example of one of the L2 requesters) to select the L2 winner 614, which is then propagated to the node 622 of the physical traffic manager L3_1 level 602. Similarly, the node 618 selects from its group of L2 requesters (the L2 requester 616 is an example of one of the L2 requesters) to select the L2 winner 620, which is propagated to the node 626 of the physical traffic manager L3_1 level 603.

The nodes 622 and 626 select the L3_1 winners 624 and 628 and propagate the winners to the nodes 630 and 634 of the physical traffic manager L3_2 level 604 respectively. The node 630 selects the L3_2 winner 632 from its group of requesters and propagates the winner to the node 642 of the physical traffic manager L4 level 605. The node 634 selects the L3_2 winner 636 from its group of requesters and skips the physical traffic manager L4 level 605 by propagating the winner directly to the node 652 of the physical traffic manager L5 level 606. Thus, the node 634 of the physical traffic manager L3_2 level 604 is mapped to the node 652 of the physical traffic manager L5 level 606 thus skipping the node 644 of the physical traffic manager L4 level 605.

The node 642 of the physical traffic manager L4 level 605 selects the L4 winner 640 from its group of requesters and propagates the winner to the node 648 of the physical traffic manager L5 level 606. The nodes 648 and 652 select the L5 winners 646 and 650 and propagate the winners to the node 656 of the physical traffic manager L6 level 617 respectively. The node 656 selects the L6 winner 654 from its requesters.

Figure 7:
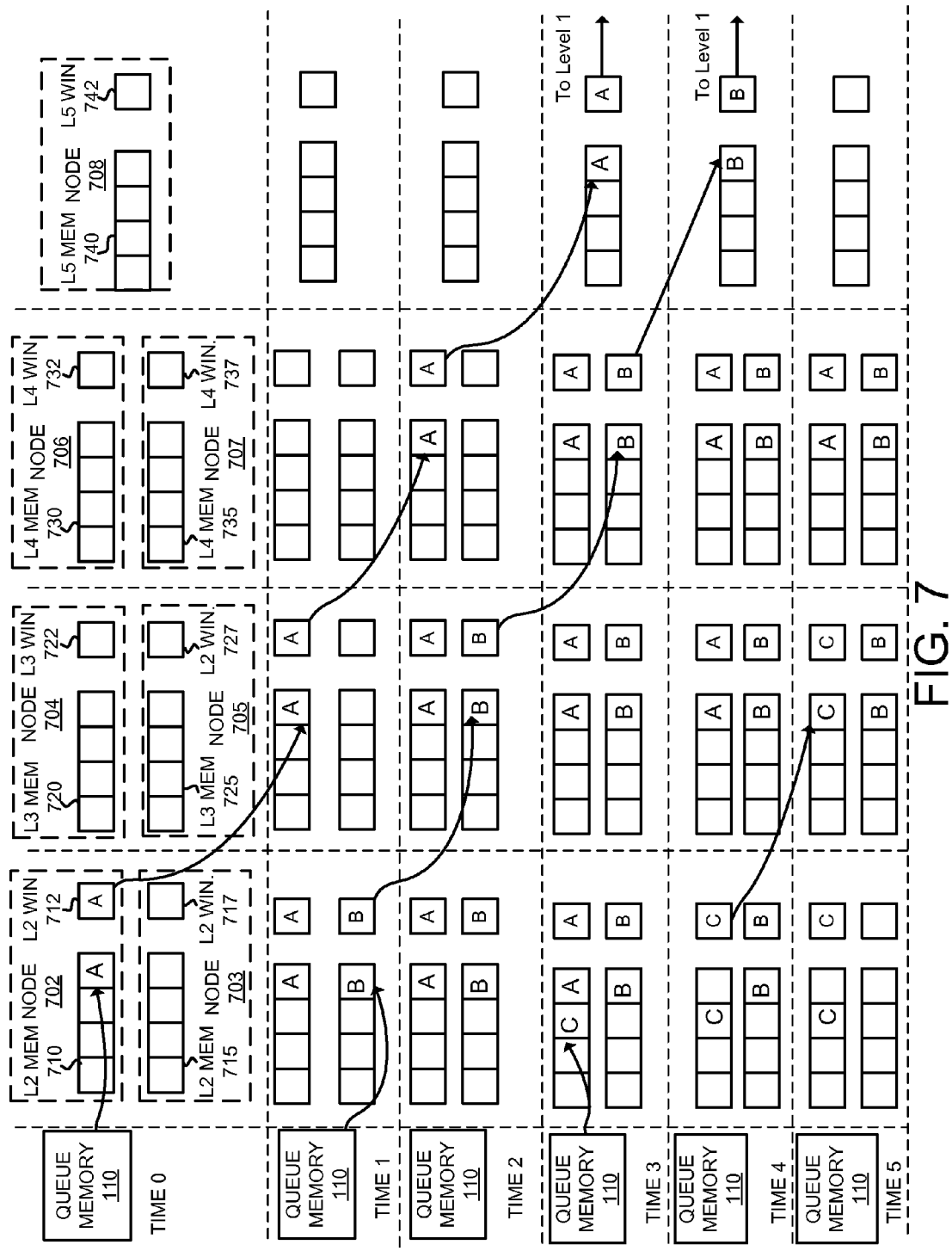
FIG. 7 illustrates a parallel winner selection and propagation in a hierarchical traffic manager according to one embodiment of the invention.

In some embodiments, the winner selection and propagation between levels is done in parallel to reduce the time in selecting winners. FIG. 7 illustrates a parallel winner selection and propagation in a hierarchical traffic manager according to one embodiment of the invention. As illustrated in FIG. 7, there are five levels of hierarchy (e.g., the L5 winner is the final winner). There are two nodes in the second level (nodes 702 and 703), two nodes in the third level (nodes 704 and 705), two nodes in the fourth level (nodes 706 and 707) and a single node in the fifth level (node 708). The nodes 702 and 703 include the L2 requester memories 710 and 715 and the L2 winner memories 712 and 717 respectively. The nodes 704 and 705 include the L3 requester memories 730 and 735 and the L3 winner memories 722 and 727 respectively. The nodes 706 and 707 include the L4 requester memories 730 and 735 and the L4 winner memories 732 and 737 respectively. The node 708 includes the L5 requester memory 740 and the L5 winner memory 742.

At time 0, the packet A is admitted into the L2 requester memory 710 of the node 701 and has been selected by the node 702 as its L2 winner (a set of A's information is written to the L2 winner memory 712). At a time 1, the packet A is propagated from the node 702 to the node 704 (information of packet A is written to the L3 requester memory 720) and is selected by the node 704 as its L3 winner (A's information is written to the L3 winner memory 722). In addition, packet B is admitted into the L2 requester memory 715 of the node 703 and has been selected by the node 703 as its L2 winner (a set of B's information is written to the L2 winner memory 717).

At time 2, the packet A is propagated from the node 704 to the node 706 (information of packet A is written to the L4 requester memory 730) and is selected by the node 706 as its L4 winner (a set of A's information is written to the L4 winner memory 732). In addition, the packet B is propagated from the node 703 to the node 705 (information of packet B is written to the L3 requester memory 725) and is selected by the node 705 as its L3 winner (a set of B's information is written to the L3 winner memory 727).

At a time 3, the packet A is propagated from the node 706 to the node 708 (information of packet A is written to the L5 requester memory 740) and is selected by the node 708 as its L5 winner (a set of A's information is written to the L5 winner memory 742). The packet A may be transmitted or processed accordingly after being selected as the L5 winner. In addition, the packet B is propagated from the node 705 to the node 707 (information of packet B is written to the L4 requester memory 735) and is selected by the node 707 as its L4 winner (a set of B's information is written to the L4 winner memory 737). In addition, the packet C is admitted into the L2 requester memory 710 of the node 701. In one embodiment, the admission of the packet C into the L2 requester memory 710 does not trigger an arbitration process since there is an outstanding winner (e.g., the information of A is in the L2 winner memory 712) regardless of the priority of the packet C (e.g., C may have a higher priority than packet A).

At a time 4, the packet A is propagated from the node 708 back to the level 1 (a reentry) with an empty status to cause the information for packet A to be removed from the hierarchical traffic manager. Thus, the packet A is removed from the queue memory 110, the L2 requester memory 710, and the L2 winner memory 712 during the time 4. In one embodiment, the queue reentry request automatically triggers the node 702 to perform an arbitration on the packets in the L2 requester memory 710. Thus, the node 702 selects the packet C as its L2 winner (a set of C's information is written to the L2 winner memory 712). In addition, the packet B is propagated from the node 707 to the node 708 (information of packet B is written into the L5 requester memory 740) and is selected by the node 708 as the L5 winner (a set of B's information is written to the L5 winner memory 742).

At a time 5, the packet A is removed from the L3 requester memory 720 and the L3 winner memory 722. The packet B is propagated from the node 708 back to the level 1 (a reentry) with an empty status to cause the information for packet B to be removed from the hierarchical traffic manager. Thus, the packet B is removed from the queue memory 110, the L2 requester memory 715, and the L2 winner memory 717. In addition, the packet C is propagated from the node 702 to the node 704 (information of packet C is written to the L3 requester memory 720) and is selected by the node 704 as its L3 winner (a set of C's information is written to the L3 winner memory 722).

Thus, it should be understood that the node 708 has selected back to back L5 winners (e.g., final winners) (at times 3 and 4) due to the parallel winner propagation and the parallel winner selection process. Thus, unlike typical prior art traffic managers which select winners in a serial fashion, the hierarchical traffic managers described may select winners in a parallel and distributed fashion to increase the speed of winner selection while maintaining the bandwidth requirements to comply with SLAs.

In some embodiments, after a last queue is selected as a winner, the same queue cannot be selected again until the queue is updated with new information including new or updated weight tokens. Since there may be a delay in updating the weight tokens for a given queue, packet batching may be used to support back to back same queue winner selection without causing any gaps in the scheduling time (e.g., there is not a scheduling gap if the amount of packets in the batching is larger than the time to update the weight tokens for the queue). Packet batching allows a level one node to carry multiple packets but as a single requestor to its parent node (e.g., a level two node) which would inherit each of the packets as a batch and propagate its packet and so on, until a final winner is selected which selects one of those packets of the batch at a time.

Figure 8A:
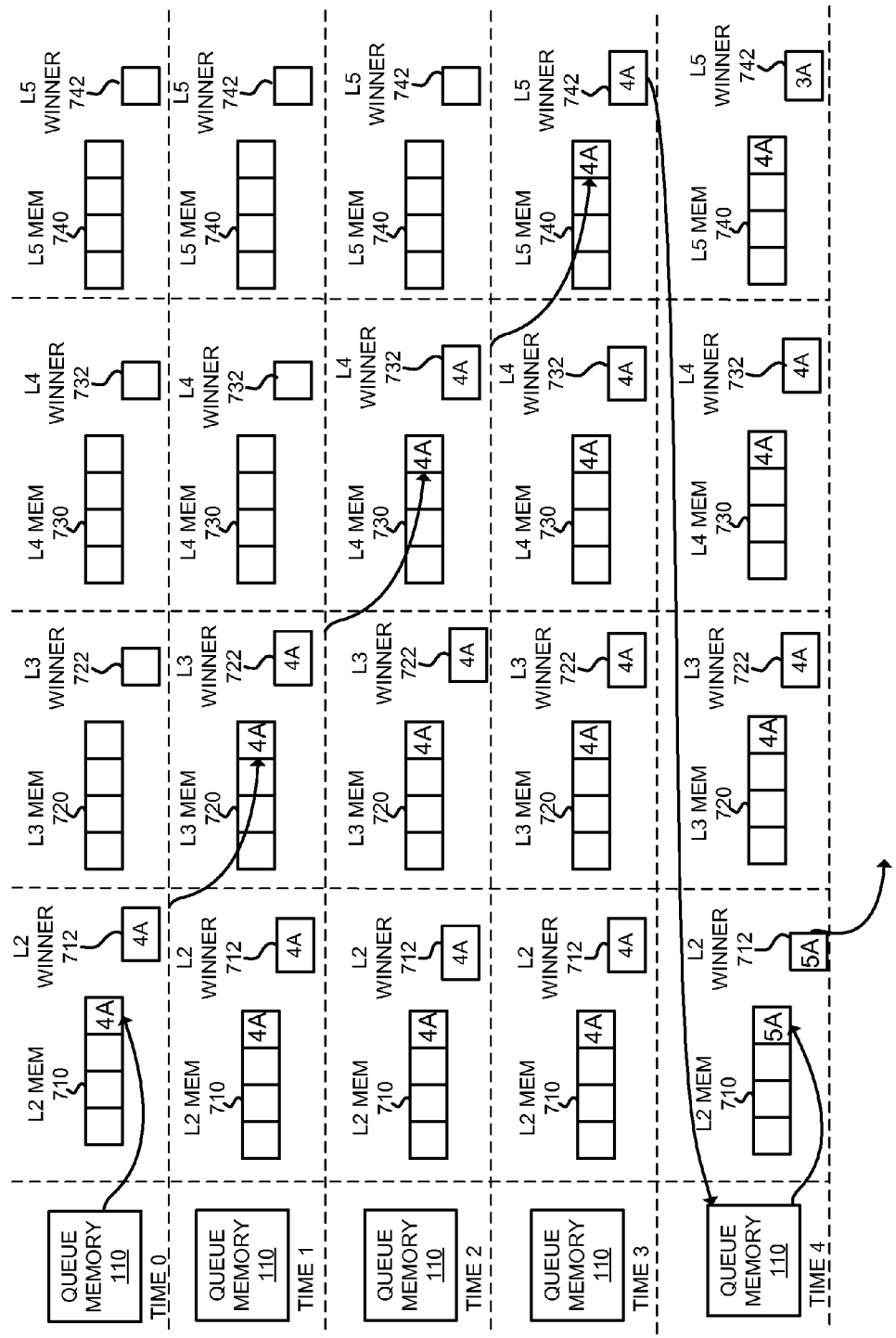
FIGS. 8A-B illustrate a parallel winner selection and propagation in a hierarchical traffic manager with packet batching according to one embodiment of the invention.
Figure 8B:
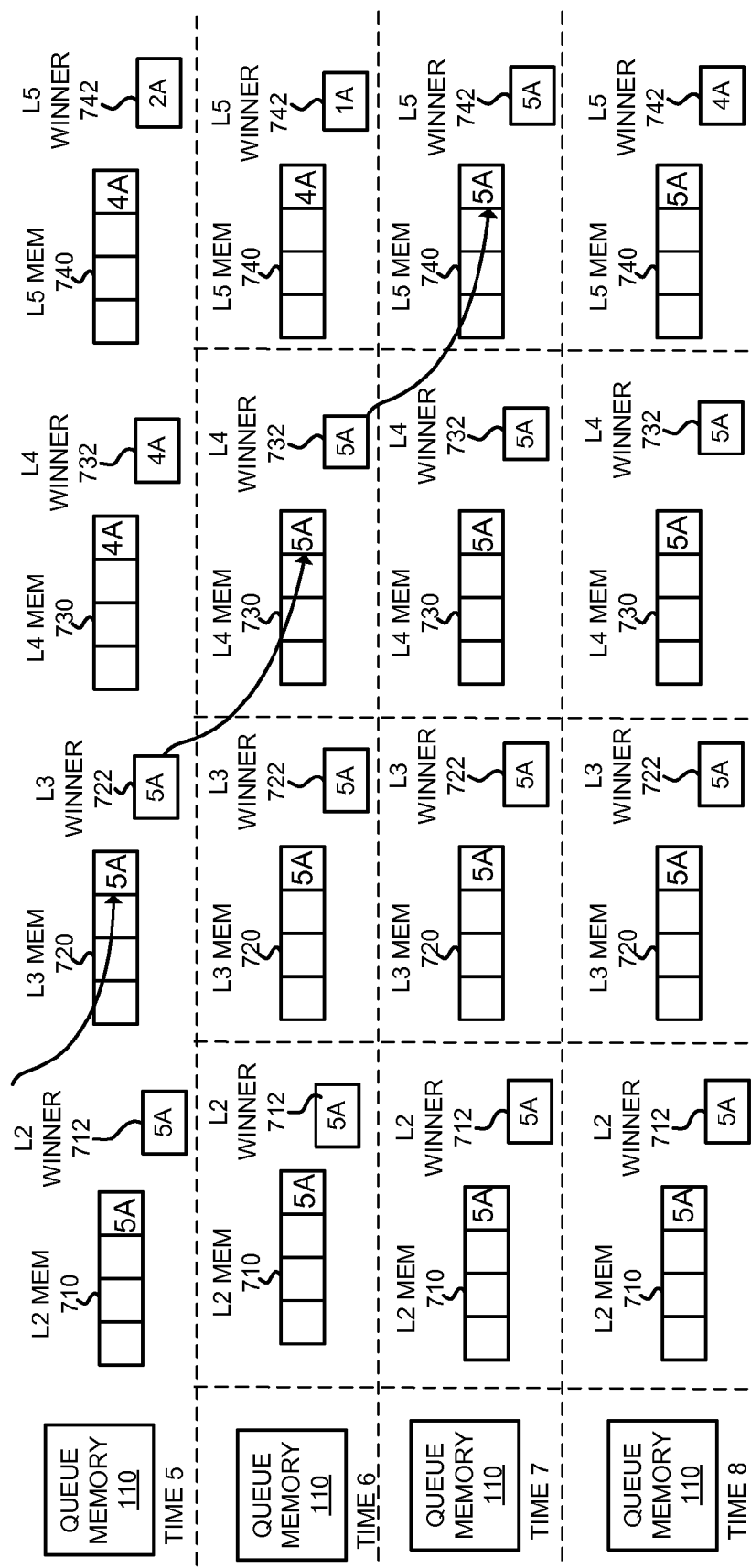

FIGS. 8A-B illustrate a parallel winner selection and propagation in a hierarchical traffic manager with packet batching according to one embodiment of the invention. As illustrated in FIG. 8A-B, there are five levels of hierarchy (e.g., the L5 winner is the final winner). For purposes of explanation, there is a single node in the levels 2 through 5 (corresponding to the nodes 702, 704, 706, and 708 as described with reference to FIG. 7).

At a time 0, a batch of four A packets is admitted into the hierarchical traffic manager and is selected as the L2 winner of the L2 requestor memory 710. At a time 1, the entire batch of four A packets is propagated to level three and the batch is selected as the level three winner of the L3 requestor memory 720. At a time 2, the entire batch of four A packets is propagated to level four and the batch is selected as the level four winner of the L4 requestor memory 730. At a time 3, the entire batch of four A packets is propagated to level five and the batch is selected as the level 5 winner of the L5 requestor memory 740. Since the level 5 winner (the last level in this example) is a batch of packets, one of the packets is selected (typically the first packet of the batch) to leave the hierarchical traffic manager.

At a time 4, no new L5 winner is selected since there are outstanding batch packets. The second one of the four A packets is sent out of the hierarchical traffic manager. In addition, the batch of 4 packets is propagated back to the level 1. A new batch of 5 A packets of the same queue is admitted to the hierarchical traffic manager and is selected as the L2 winner of the L2 requester memory 710.

At a time 5, the third one of the four A packets is sent out of the hierarchical traffic manager. In addition, the batch of 5 A packets is propagated to the level 3 and the batch is selected as the level 3 winner of the L3 requestor memory 720. At time 6, the fourth one of the four A packets leaves the hierarchical traffic manager. In addition, the batch of 5 A packets is propagated to level 4 and the batch is selected as the level 4 winner of the L4 requester memory 730.

At time 7, the batch of 5 A packets is propagated to level 5 and the batch is selected as the level 5 winner of the L5 requester memory 730. Thus, a new winner is selected (from the same queue). In addition, the first of the 5 A packets leaves the hierarchical traffic manager. At time 8, the second of the 5 A packets leaves the hierarchical traffic manager.

Figure 9A:
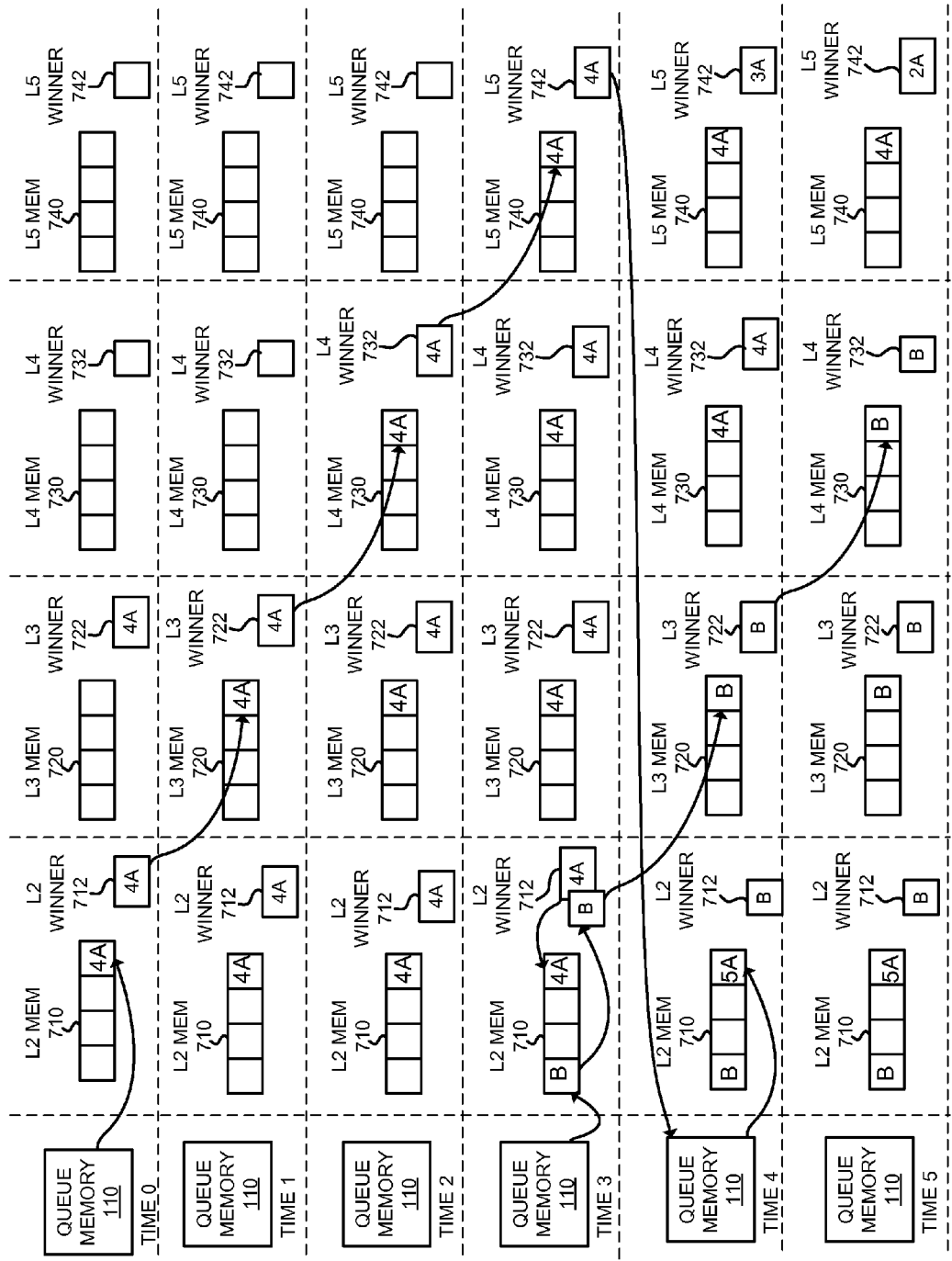
FIGS. 9A-B illustrate preemption in a hierarchical traffic manager according to one embodiment of the invention.
Figure 9B:
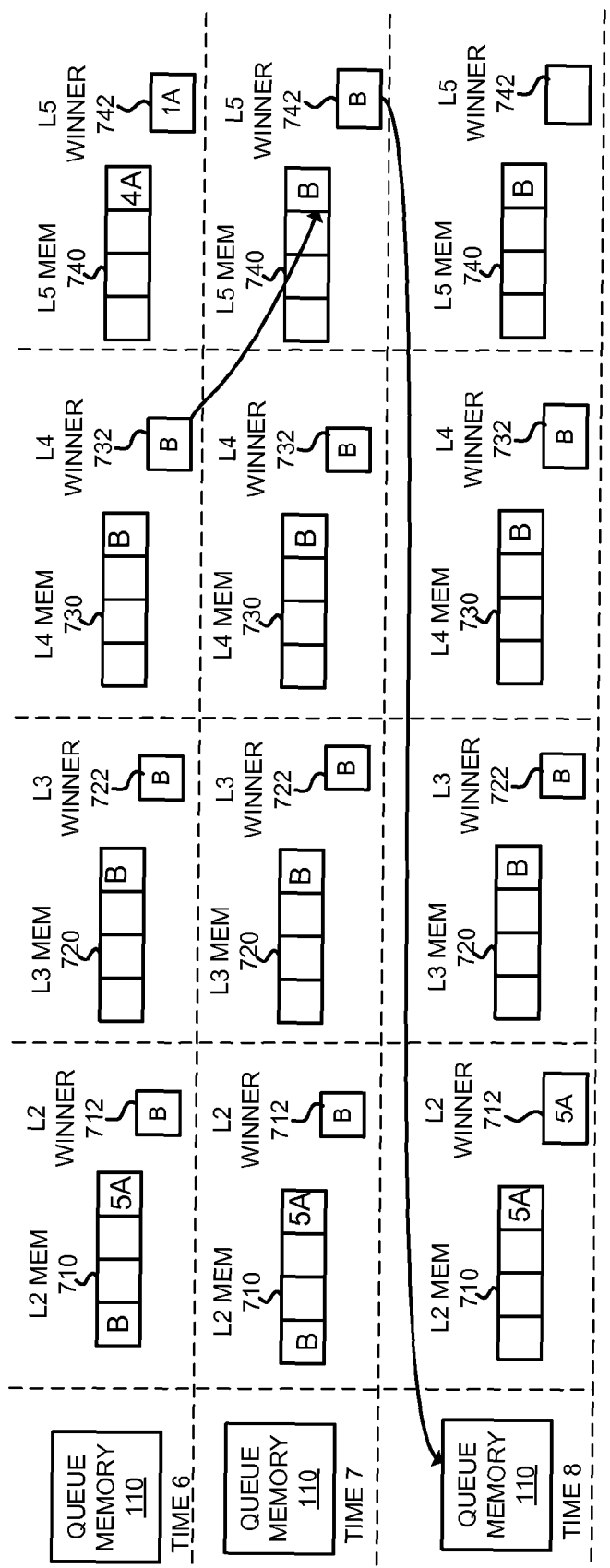

In some embodiments, to avoid latency caused by "head of line" blocking caused latency, a preemption capability is used which allows a node with a higher priority to move to a level by replacing the current winner node. FIGS. 9A-B illustrate preemption in a hierarchical traffic manager according to one embodiment of the invention. Similar to FIGS. 8A-B, in FIGS. 9A-B there are five levels of hierarchy (e.g., the L5 winner is the final winner). For purposes of explanation, there is a single node in the levels 2 through 5 (corresponding to the nodes 702, 704, 706, and 708 as described with reference to FIG. 7).

At time 0, a batch of four A packets is admitted into the hierarchical traffic manager and is selected as the L2 winner of the L2 requester memory 710. At a time 1, the entire batch of four A packets is propagated to level three and the batch is selected as the level three winner of the L3 requester memory 720. At a time 2, the entire batch of four A packets is propagated to level four and the batch is selected as the level four winner of the L4 requester memory 730.

At a time 3, the entire batch of four A packets is propagated to level five and the batch is selected as the level 5 winner of the L5 requester memory 740. Since the level 5 winner (the last level in this example) is a batch of packets, one of the packets is selected (typically the first packet of the batch) to leave the hierarchical traffic manager. Additionally, the packet B is admitted to the hierarchical traffic manager and is written to the L2 requester memory 710 (the packet B belongs to a different queue than the batch of four A packets). The queue containing the packet B has higher arbitration precedence than the queue containing the batch of 4 A packets. Thus, the queue containing the packet B preempts the queue containing the batch of 4 A packets, and is selected as the L2 winner of the L2 requester memory 710 (the packet B replaces the batch of 4 A packets in the L2 winner memory 712). It should be understood that if preemption did not occur, the packet B would stay in the L2 requester memory 710 until the queue containing the batch of 4 A packets re-entered the hierarchical traffic manager (which will occur at a time 4).

At time 4, the packet B is propagated to level three and is selected as the level 3 winner of the L3 requester memory 720 (it replaces the batch of 4 A packets). Additionally, the queue containing the batch of 4 A packets re-enters the queue memory 110 and the hierarchical traffic manager with a batch of 5 A packets, and the second of the four A packets leaves the hierarchical traffic manager.

At time 5, the packet B is propagated to level four is selected as the level 4 winner of the L4 requester memory 720 (it replaces the batch of 4 A packets). Additionally, the third of the four A packets leaves the hierarchical traffic manager. Furthermore, since the queue containing the outstanding L2 winner (B) has a higher arbitration precedence than the queue containing the batch of 5 A packets, the packet batch is not selected as a winner until the queue containing packet B reenters the hierarchical traffic manager.

At time 6, the last of the four A packets leaves the hierarchical traffic manager. The packet B is not propagated to level five until all of the batch of packets leaves the hierarchical traffic manager.

At time 7, the packet B is propagated to level five and is selected as the level 5 winner of the L5 requester memory 740. The packet B thus leaves the hierarchical traffic manager.

At time 8, the queue containing the packet B re-enters the hierarchical traffic manager with 0 packets which causes the removal of the information of packet B in the L2 requester memory 710. Additionally, since the queue containing packet B has re-entered the hierarchical traffic manager, the batch of 5 A packets is selected as the level 2 winner of the L2 requester memory 710.

The weight tokens are refreshed periodically. For example, each node of a traffic manager level may have their tokens refreshed at the same time (global token refresh) (e.g., when they all have either negative tokens or empty/blocked states). As another example, individual nodes may have their individual tokens refreshed (local token refresh) when the state of the node changes from non-empty to empty (with reference to FIG. 1, local token refresh applies to the nodes in the L1 nodes level 128, L2 nodes level 130, L3 nodes level 132, and the L4 nodes level 134). As yet another example, tokens may be refresh for a subset of nodes (partial token refresh) which are associated with the same parent node that has change from a state from blocked to unblocked.

In one embodiment, for a global token refresh, all nodes of a level of the hierarchical traffic manager with their default token value at the time when all the nodes either have a negative token or an empty/blocked state. As described above, a node's tokens are deducted by the size of the packet(s) when they are admitted into the hierarchical traffic manager (e.g., a level 2 scheduling block) and may become negative after some amount of time.

Each node includes a set of counters to track and maintain the weight tokens. For example, each node includes a running weight token counter to keep track of the current value of the weight token for the node. The running weight token counter is decremented when that queue is admitted to the hierarchical traffic manager by the size of the packet(s) of that queue. The running weight token counter may be replenished (e.g., with a software programmable default value) if any one or more of the following conditions is true: if the counter is below zero (there are no more tokens), if the node transitions from empty to non-empty and there is at least one global token refresh occurred during the empty period, if the node transitions from blocked to un-blocked and there is a global token refresh during the blocked period, if any of the node's parent nodes (e.g., parent, grandparent, great-grandparent, etc.) transitions from blocked to unblocked and there is a global token refresh during the blocked period.

Each node may also include a token turn negative flag counter to track the number of times the running weight token counter turns negative. In one embodiment, the value of the token turn negative flag counter is used as an arbitration parameter (e.g., a node with a lower token turn negative flag counter value is preferred over other nodes with higher token turn negative flag counters). In one embodiment, the value of the token turn negative flag counter is reset when the node transitions from empty to non-empty, transitions from blocked to un-blocked, any of the node's parent nodes transitions from blocked to un-blocked.

Each node may also have a global token refresh counter to track global token refresh events. The global token refresh counter functions as a reference counter for those nodes which have transitioned from empty to non-empty, or from blocked to-unblocked. For example, if a node in a level transitions from empty to non-empty, or from blocked to unblocked, the value of the global token refresh counter is loaded into their counter to sync with the other nodes in the level. The global token refresh counter is incremented when a node at the last level (e.g., a L6 winner node) has indicated that all running tokens of the level of the node are negative.

In one embodiment, responsive to a node transition from an empty state to a non-empty state, a local token refresh operation is performed (the weight token for that node is refreshed with a software programmable value). For example, the non-empty status for a level one node transitions when an empty queue receives one or more packets. For nodes in higher levels, the non-empty status transitions when one of its child nodes becomes non-empty. In one embodiment, the local token refresh operation will be performed only if a token refresh (e.g., a global token refresh) has occurred during the time the node was in the empty state (e.g., the weight tokens for a node will not be refreshed if the node's local token refresh count is equal to the global token refresh count).

In one embodiment, when a higher level node (higher than level one) transitions from blocked to un-blocked, all of that node's child nodes (which may include multiple levels of child nodes) weight tokens are refreshed (a partial token refresh).

In one embodiment, one or more of the levels in the hierarchical traffic manager may include one or more sub-levels depending on aggregation requirements. For example with reference to FIG. 1, the L3 nodes level 132 may include four sub levels (e.g., L3_1, L3_2, L3_3, L3_4) based on the aggregation ratio between level two and level three.

Figure 10:
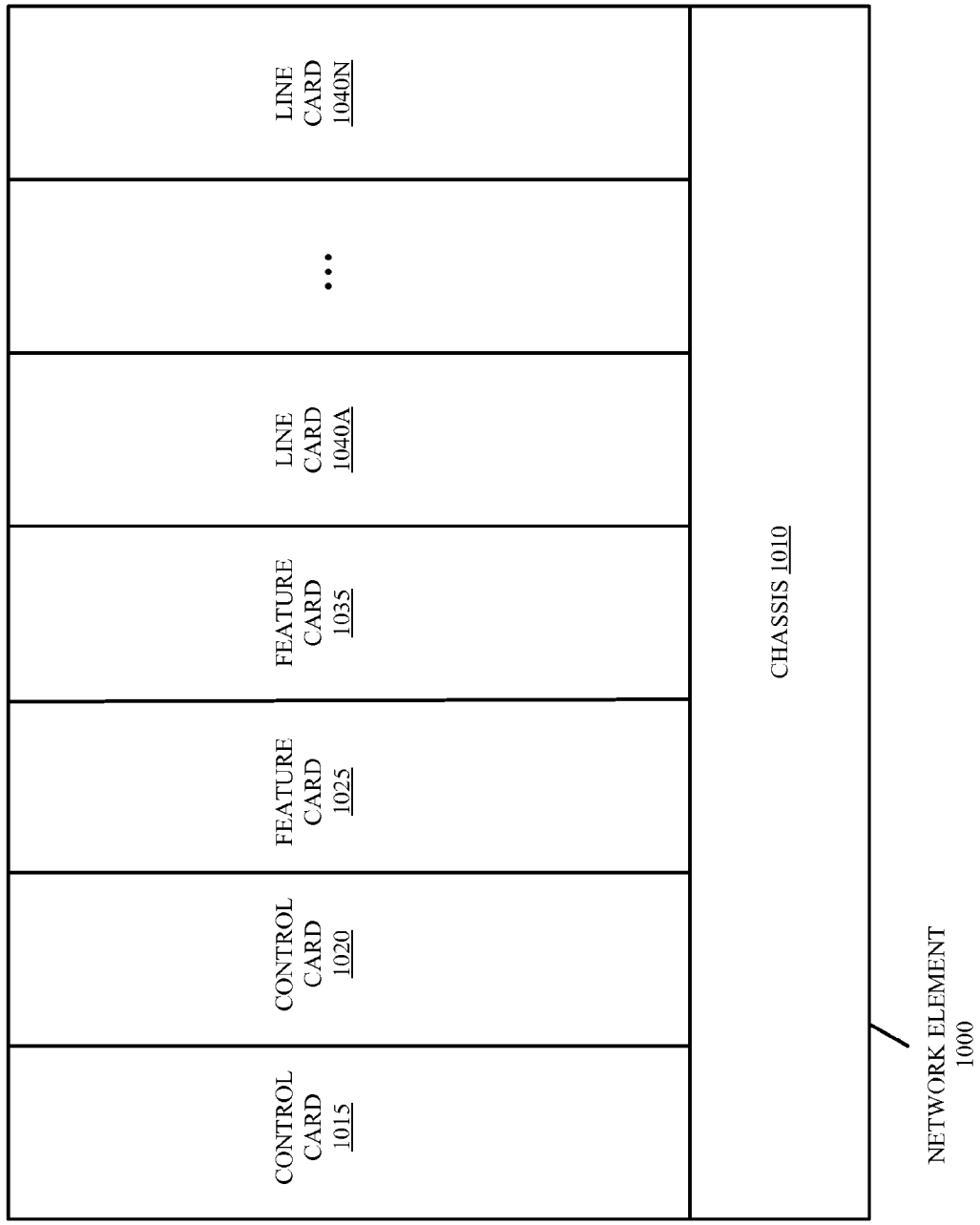
FIG. 10 illustrates an exemplary network element used in embodiments of the invention.

FIG. 10 is a block diagram exemplary illustrating an exemplary network element which may be used in some embodiments of the invention. The network element 1000 includes the control cards 1015 and 1020, the feature cards 1025 and 1035, and the line cards 1040A-1040N, each coupled with the chassis 1010. While in one embodiment of the invention the chassis 1010 is coupled to the control cards 1015 and 1020, the feature cards 1025 and 1035, and the line cards 1040A-1040N, in alternative embodiments of the invention multiple other devices and/or modules are coupled to the chassis 1010. While in one embodiment of the invention the distributed control plane includes the control cards 1015 and 1020, the feature cards 1025 and 1035, and the line cards 1040A-1040N, alternative embodiments of the invention may have alternate card arrangements (e.g., a combined line and control card with one or more ports and a forwarding engine, one control card per line card, multiple feature cards per line cards, etc.).

Each of the control cards, feature cards, and line cards includes one or more processors and one or more memories. For example, each of the line cards 1040A-1040N include one or more packet processing units and one or more memories. As described, above, the hierarchical traffic manager 105 may be included as part of a packet processing unit of a line card or may be implemented as a separate ASIC. As described above, in one embodiment, each of the line cards 1040A-1040N include a hierarchical traffic manager.

In one embodiment, different contexts may have different configurations of the hierarchical traffic manager. For example, different contexts of the network element may associate the nodes between levels differently.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus, comprising:
   a queue memory enqueue/dequeue and hierarchical traffic manager admission arbiter to perform the following:
      arbitrate between a set of one or more requesters including new packet enqueue requests and queue reentry requests, and
      selectively admit queues corresponding to the new packet enqueue requests and queue reentry requests into a hierarchical pipelined distributed scheduling traffic manager; and
   the hierarchical pipelined distributed scheduling traffic manager coupled with the queue memory enqueue/dequeue and hierarchical traffic manager admission arbiter, the hierarchical pipelined distributed scheduling traffic manager including the following:
      a lowest level including a plurality of nodes each associated with a node of one of a plurality of intermediate levels, each node at the lowest level representing a different queue,
      the plurality of intermediate levels each including a plurality of nodes each associated with a plurality of nodes at a lower level and a node at a higher level, each node of the intermediate levels to include a scheduler to perform the following:
         select winning queues between the associated plurality of nodes at the lower level, and
         propagate the winning queues to the associated node at the higher level, and
      a highest level including a node associated with a plurality of nodes at a lower level, the node to include a scheduler to perform the following:
         select winning queues between the associated plurality of nodes at the lower level,
         cause the winning queues to exit the hierarchical pipelined distributed scheduling traffic manager, and
         generate queue reentry requests corresponding to the winning queues.

2. The apparatus of claim 1, wherein the set of requesters further includes packet dequeue requests that each corresponds to a set of one or more packets of a queue that are ready to leave that queue, wherein the queue memory enqueue/ dequeue and hierarchical traffic manager admission arbiter is to perform the following for each selected packet dequeue request,
  decrement a number of packets currently enqueued in that corresponding queue by a quantity of the set of packets;
  decrement a number of bytes that correspond to the packets currently enqueued in that corresponding queue by an amount of bytes of the set of packets;
  decrement a packet offset value by the quantity of the set of packets; and
  begin a packet transmission process.

3. The apparatus of claim 1, wherein the hierarchical pipelined distributed scheduling traffic manager is separated into a plurality of separate sliced hierarchical pipelined distributed scheduling traffic manager that each include their own memories, shapers, and schedulers.

4. The apparatus of claim 1, wherein at least some of the selectively admitted queues are admitted into the hierarchical pipelined distributed scheduling traffic manager as a batch of packets, wherein the batch of packets allow for back to back same winning queue selection.

5. The apparatus of claim 1, wherein each of the schedulers of the intermediate levels is further to perform the following:
  preempt a previous winning queue with a current winning queue if the current winning queue has a higher arbitration precedence than the previous winning queue; and
  propagate the current winning queue to the associated node at the higher level.

6. The apparatus of claim 1, wherein an aggregation ratio between levels is configurable by a system operator.

7. The apparatus of claim 1, wherein the hierarchical pipelined distributed scheduling traffic manager is to perform winning queue selection in parallel.

8. The apparatus of claim 1, wherein at least some of the nodes of one of the intermediate levels is selectively associated with a node at a higher level that is not a next highest level relative to that intermediate level.

9. The apparatus of claim 1, wherein the set of requesters further includes rate token update requests that each correspond to a queue, wherein the queue memory enqueue/dequeue and hierarchical traffic manager admission arbiter is to perform the following for each rate token update request,
  retrieve a rate token running counter for the queue associated with the rate token update request;
  add one or more tokens to the rate token counter;
  determine whether the added tokens cause a rate status change and generate a rate status change request for one of the nodes at one of the intermediate levels.

10. The apparatus of claim 9, wherein each of the nodes of each of the intermediate levels and the node at the highest level further includes an arbiter to arbitrate between multiple requester groups including new packet enqueue requests, queue reentry requests, and rate status change requests to select requests for the scheduler to process, wherein the selected requests are passed to the scheduler to process.

11. The apparatus of claim 1, wherein each node at the lowest level and the plurality of intermediate levels is associated with a set of one or more scheduling precedence parameters that are used during selection of a winning queue.

12. The apparatus of claim 11, wherein the set of scheduling precedence parameters includes weight tokens, a priority, and rate status, wherein the queue memory enqueue/dequeue and hierarchical traffic manager admission arbiter is further to deduct the length of one or more packets from a weight token that is associated with each queue entering the hierarchical pipelined distributed scheduling traffic manager.

13. A method for traffic management, comprising:
  arbitrating, at a queue memory enqueue/dequeue and hierarchical traffic manager admission arbiter, between a plurality of requester groups including a set of one or more new packet enqueue requests and a set of one or more queue reentry requests to select a request to service, wherein the new packet enqueue requests are generated in response to receipt of new packets, and wherein the queue reentry requests are generated in response to a previous winning queue;
  admitting the selected request to a hierarchical pipelined distributed traffic manager that includes a lowest level, a set of one or more intermediate levels, and a highest level, wherein the lowest level includes a plurality of nodes each associated with a node at one of the set of intermediate levels, wherein each of the set of intermediate levels includes a plurality of nodes each associated with a plurality of nodes at a lower level and a node at a higher level, and wherein the highest level includes a node associated with a plurality of nodes at a lower level;
  selecting a winning queue through hierarchical winner selection and propagation, wherein the hierarchical winner selection and propagation includes,
    at each node of each of the set of intermediate levels performing the following:
      selecting a winning queue associated between the associated nodes at the lower level, and,
      propagating the winning queue to the associated node at the higher level, and
    at the node of the highest one of the plurality of levels performing the following:
      selecting a winning queue between the associated plurality of nodes at the lower level,
      causing the wining queue to exit the hierarchical pipelined distributed traffic manager, and
      generating a queue reentry request corresponding to the winning queue.

14. The method of claim 13 wherein the plurality of requestor groups further includes a set of one or more packet dequeue requests that each correspond to a set of one or more packets of a queue that are ready to leave that queue, the method further comprising for each selected packet dequeue request:
  decrementing a number of packets currently enqueued in that corresponding queue by a quantity of the set of packets;
  decrementing a number of bytes that correspond to the packets currently enqueued in that corresponding queue by an amount of bytes of the set of packets;
  decrementing a packet offset value by the quantity of the set of packets; and
  transmitting the one or more packets.

15. The method of claim 13 wherein the plurality of requestor groups further includes a set of one or more rate token update requests that each correspond to a queue, the method further comprising for each selected rate token update request:
  retrieving a rate token running counter for the queue associated with the rate token update request;
  adding one or more tokens to the rate token counter;
  responsive to determining that the added tokens cause a rate status change, generating a rate status change request for one of the nodes at one of the intermediate levels.

16. The method of claim 13 wherein the hierarchical pipelined distributed scheduling traffic manager is separated into a plurality of separate sliced hierarchical pipelined distributed scheduling traffic manager that each include their own memories, shapers, and schedulers.

17. The method of claim 13 wherein the queue corresponding to the selected request is admitted into the hierarchical pipelined distributed scheduling traffic manager as a batch of packets, wherein the batch of packets allow for back to back same winning queue selection.

18. The method of claim 13 wherein each of the nodes of the intermediate levels further performs the following:
   preempting a previous winning queue with a current winning queue responsive to determining that the current winning queue has a higher arbitration precedence than the previous winning queue; and
   propagating the current winning queue to the associated node at the higher level.

19. The method of claim 13 wherein an aggregation ratio between levels is configurable by a system operator.

20. The method of claim 13 wherein the hierarchical pipelined distributed scheduling traffic manager is to perform winning queue selection in parallel.

21. The method of claim 13 wherein at least some of the nodes of one of the intermediate levels is selectively associated with a node at a higher level that is not a next highest level relative to that intermediate level.

22. The method of claim 13 wherein each node at the lowest level and the plurality of intermediate levels is associated with a set of one or more scheduling precedence parameters that are used during hierarchical winner selection and propagation.

23. The method of claim 22 wherein the set of scheduling precedence parameters includes weight tokens, a priority, and rate status, wherein the queue memory enqueue/dequeue and hierarchical traffic manager admission arbiter is further to deduct the length of one or more packets from a weight token that is associated with each queue entering the hierarchical pipelined distributed scheduling traffic manager.

\* \* \* \* \*

UNITED STATES PATENT AND TRADEMARK OFFICE
CERTIFICATE OF CORRECTION

| | | |
|---|---|---|
| PATENT NO. | : 7,986,706 B2 | |
| APPLICATION NO. | : 12/432373 | |
| DATED | : July 26, 2011 | |
| INVENTOR(S) | : Yip et al. | |

It is certified that error appears in the above-identified patent and that said Letters Patent is hereby corrected as shown below:

In Column 8, Line 20, delete "Quid" and insert -- Qid --, therefor.

Signed and Sealed this
Third Day of January, 2012

David J. Kappos
*Director of the United States Patent and Trademark Office*